United States Patent
Goto et al.

(10) Patent No.: US 8,005,666 B2
(45) Date of Patent: Aug. 23, 2011

(54) AUTOMATIC SYSTEM FOR TEMPORAL ALIGNMENT OF MUSIC AUDIO SIGNAL WITH LYRICS

(75) Inventors: Masataka Goto, Chiba (JP); Hiromasa Fujihara, Ibaraki (JP); Hiroshi Okuno, Kyoto (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1050 days.

(21) Appl. No.: 11/834,778

(22) Filed: Aug. 7, 2007

(65) Prior Publication Data

US 2008/0097754 A1  Apr. 24, 2008

(30) Foreign Application Priority Data

Oct. 24, 2006  (JP) .................. 2006-289289

(51) Int. Cl.
  *G10L 11/14*  (2006.01)
  *G10L 11/06*  (2006.01)
  *G10L 15/14*  (2006.01)
  *G10H 1/36*  (2006.01)
(52) U.S. Cl. ............ 704/207; 704/214; 704/256.7; 84/610
(58) Field of Classification Search .......... 704/205, 704/207, 209, 214, 256.1, 256.7, 270; 84/609, 84/610
See application file for complete search history.

(56) References Cited

U.S. PATENT DOCUMENTS

| 6,505,153 B1 * | 1/2003 | Van Thong et al. ........... 704/211 |
| 6,836,761 B1 | 12/2004 | Kawashima et al. |
| 7,487,086 B2 * | 2/2009 | Griggs ......................... 704/235 |

FOREIGN PATENT DOCUMENTS

JP  2001-125562  5/2001

OTHER PUBLICATIONS

Y. Wang et al., "LyricAlly: Automatic Synchronization of Acoustic Musical Signals and Textual Lyrics" Department of Computer Science, School of Computing, National University of Singapore, Singapore 177543 (2004).
H. Fujihara et al., "A Singer Identification Method for Musical Pieces on the Basis of Accompaniment Sound Reduction and Reliable Frame Selection" vol. 47, No. 6, pp. 1831 to 1843 (Jun. 2006).

* cited by examiner

*Primary Examiner* — Angela A Armstrong
(74) *Attorney, Agent, or Firm* — Rankin, Hill & Clark LLP

(57) ABSTRACT

An automatic system for temporal alignment between a music audio signal and lyrics is provided. The automatic system can prevent accuracy for temporal alignment from being lowered due to the influence of non-vocal sections. Alignment means of the system is provided with a phone model for singing voice that estimates phonemes corresponding to temporal-alignment features or features available for temporal alignment. The alignment means receives temporal-alignment features outputted from temporal-alignment feature extraction means, information on the vocal and non-vocal sections outputted from vocal section estimation means, and a phoneme network, and performs an alignment operation on condition that no phoneme exists at least in non-vocal sections.

12 Claims, 21 Drawing Sheets

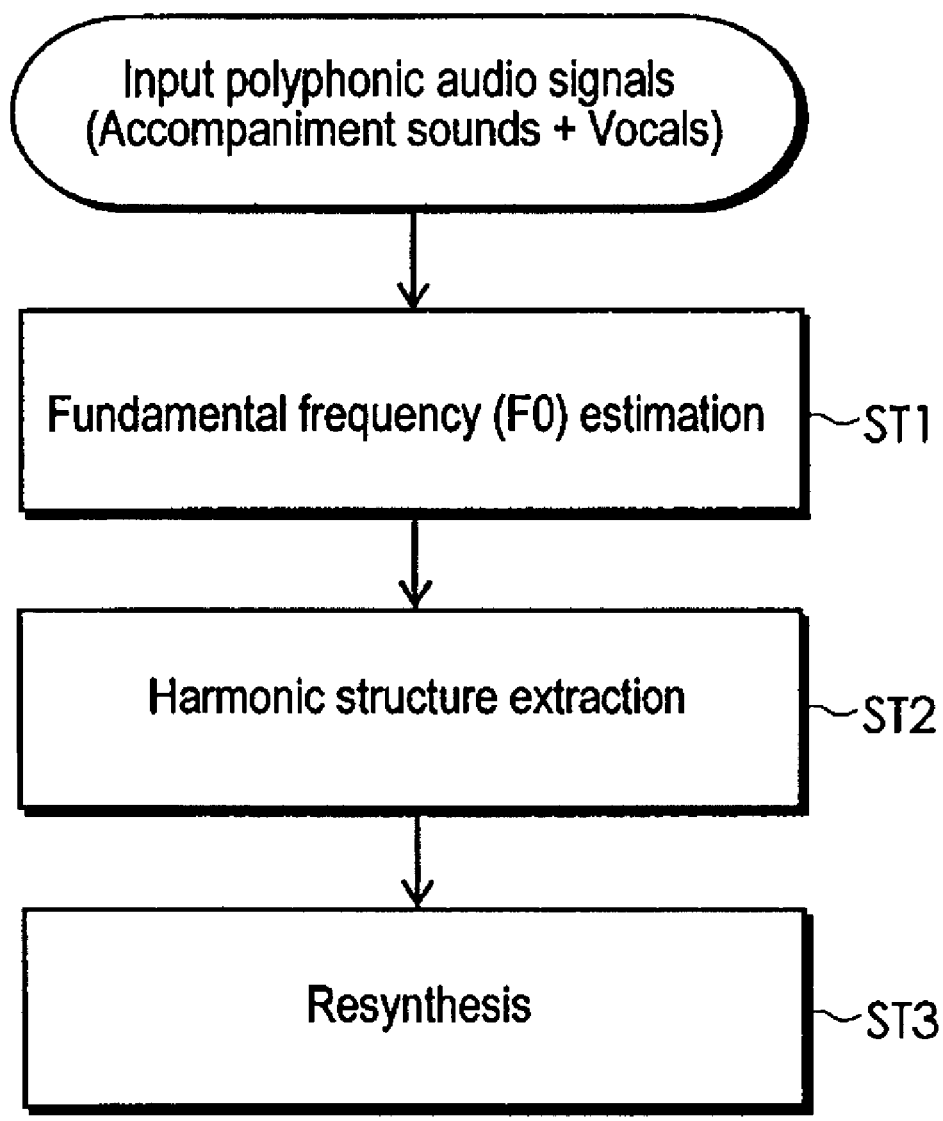

Input (Polyphonic audio signals)

S1

F0 Estimation

Harmonic Structure Extraction

Resynthesis

S2

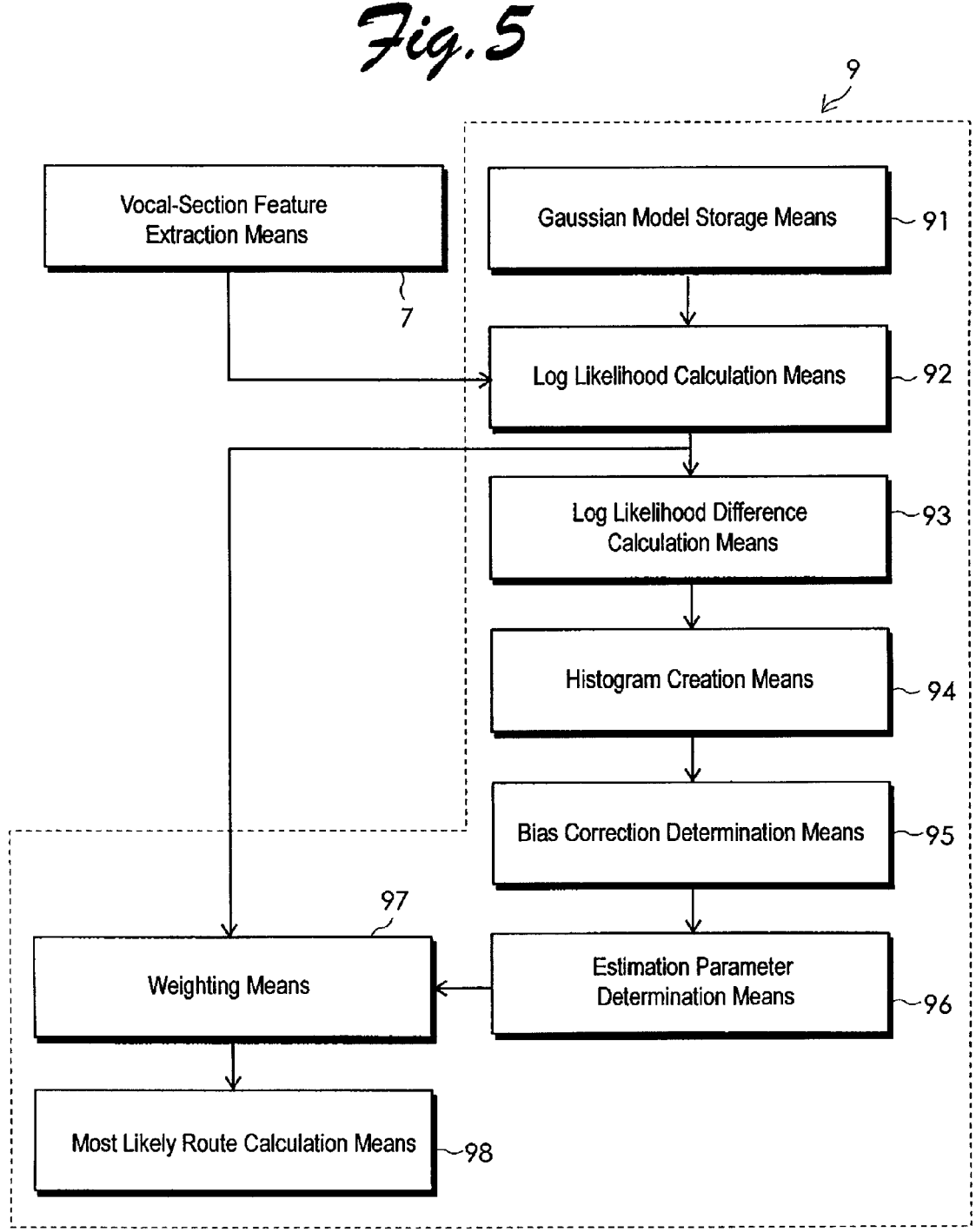

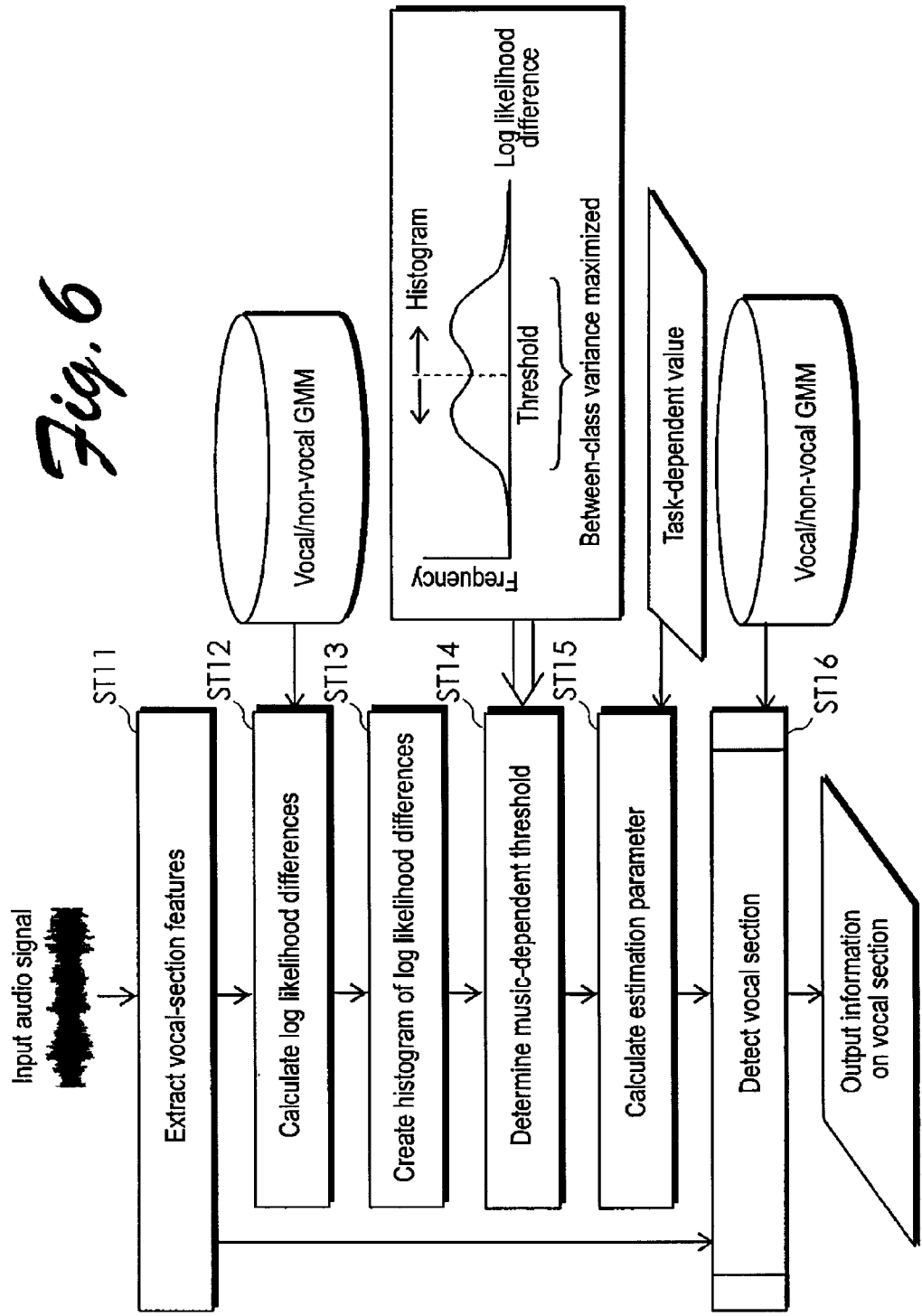

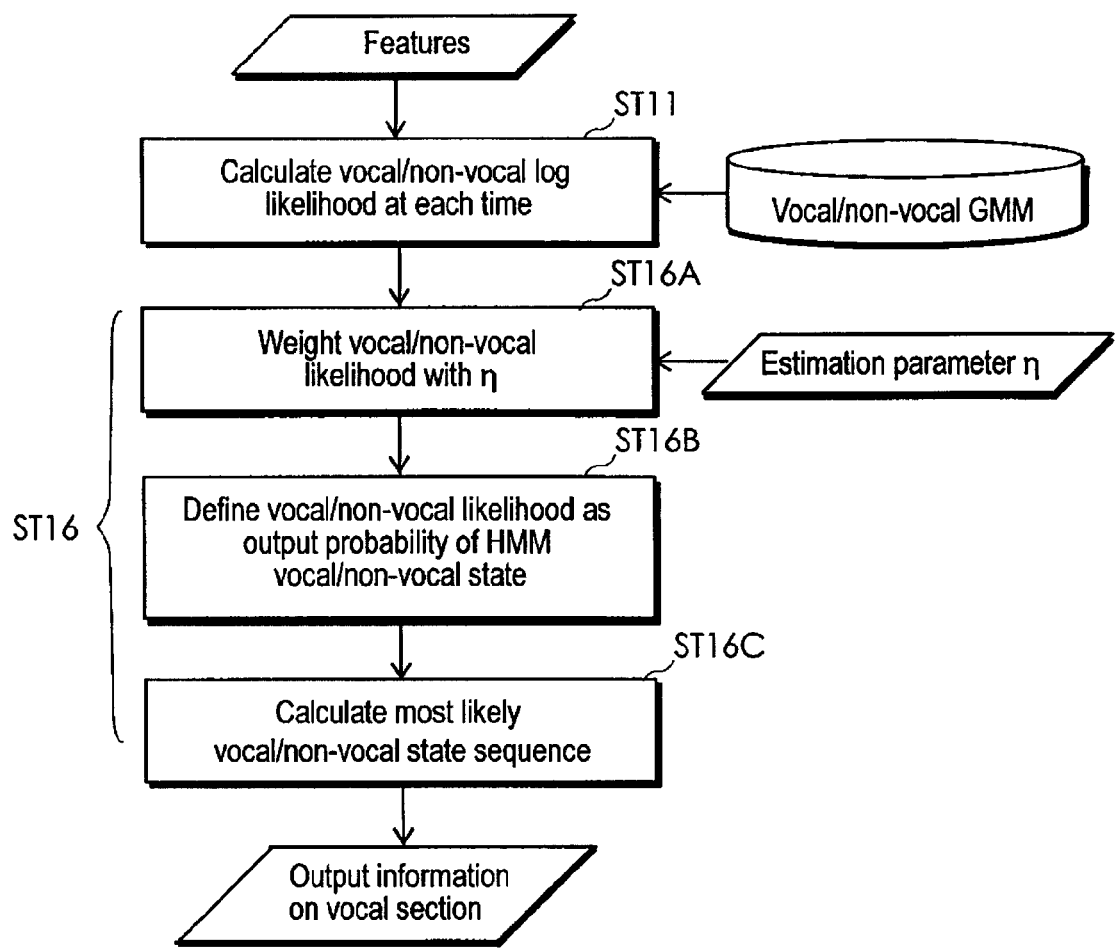

Fig. 9

| Sampling | 16 kHz, 16 bit |
|---|---|
| Window Function | Hamming Window |
| Frame Width | 25 ms |
| Frame Shift | 10 ms |
| Sampling | 12th Order (12th order MFCC)<br>12th Order (12th order ΔMFCC)<br>Δ Power |

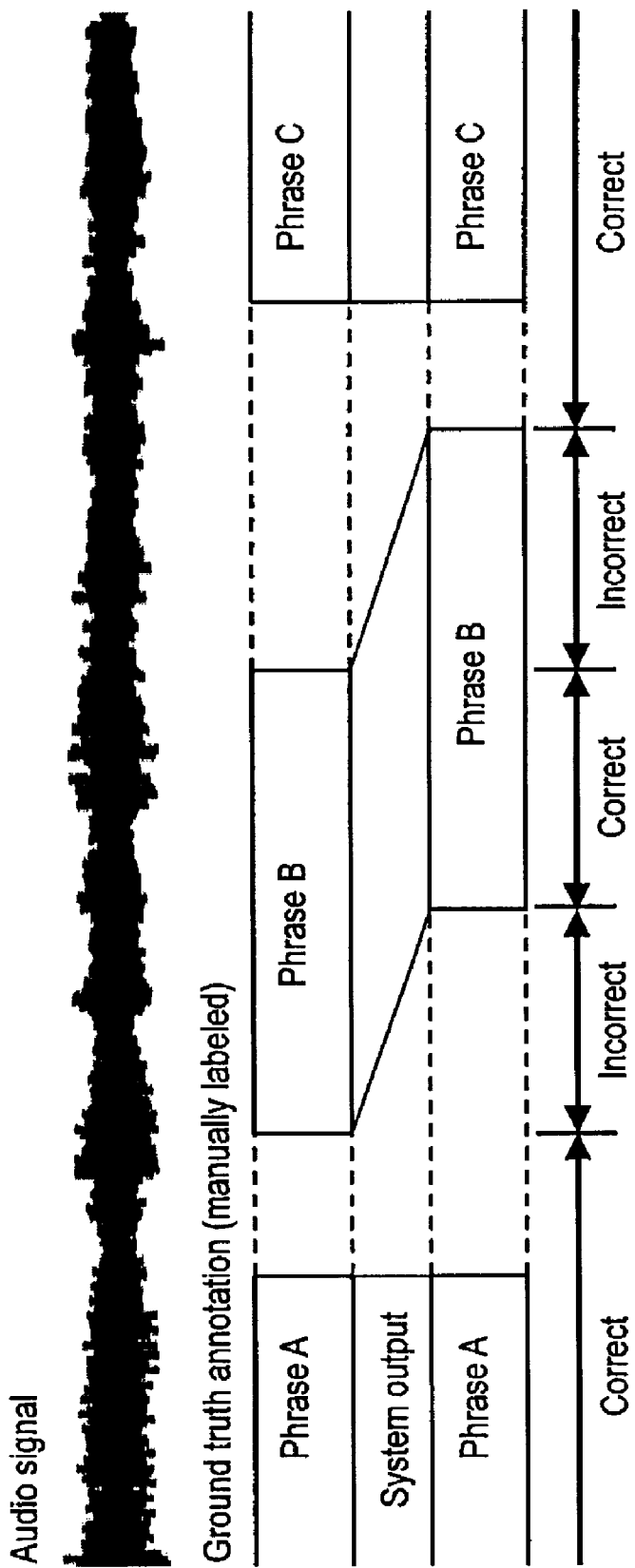

| | | |
|---|---|---|
| Male | #012 | 0.3868 [sec] |
| | #027 | 0.2717 [sec] |
| | #032 | 0.1292 [sec] |
| | #037 | 0.1108 [sec] |
| | #039 | 0.7783 [sec] |
| Female | #007 | 1.9318 [sec] |
| | #013 | 1.4954 [sec] |
| | #020 | 0.2911 [sec] |
| | #065 | 0.2578 [sec] |
| | #075 | 0.1182 [sec] |

|  | Application to vocals without Accompaniments | Application to segregated vocals | Application to particular singer | Accuracy |
|---|---|---|---|---|
| Condition i | × | × | × | 68% |
| Condition ii | × | ○ | × | 84% |
| Condition iii | ○ | ○ | × | 87% |
| Condition iv | ○ | ○ | ○ | 89% |

AUTOMATIC SYSTEM FOR TEMPORAL ALIGNMENT OF MUSIC AUDIO SIGNAL WITH LYRICS

FIELD OF THE INVENTION

The present invention relates to a system that automatically makes temporal alignment between lyrics and a music audio signal including vocals and accompaniment sounds, an apparatus therefore, and a computer program used in the system.

BACKGROUND OF THE INVENTION

Typically, in so-called "Karaoke" equipment, utterance (lyrics) and accompaniment sounds (accompaniments) are temporally synchronized and visually displayed when reproducing or playing back digital music data (music audio signals) recorded in a recording medium such as a compact disc (CD), especially digital music data comprising human voices (e.g. vocals) and non-human sounds (e.g. accompaniments). In the existing Karaoke equipment, however, accompaniment sounds and vocals of a singer are not exactly synchronized. The lyrics of a song are merely displayed in order on a screen at a tempo or pace planned in the musical score. For this reason, actual timing of utterance often gets of alignment with timing of lyrics displayed on the screen. In addition, synchronization between the vocals and accompaniment sounds is manually performed, thereby requiring a considerable amount of human efforts.

As is typically represented by speech or voice recognition techniques, a technique that analyzes human utterance or speech is conventionally known. This technique is intended to identify uttered portions (lyrics) of digital music data that include vocals alone and do not include accompaniment sounds (which will be hereinafter referred to as "vocals without accompaniments"). With regard to such techniques, some studies have been reported. However, it is extremely difficult to directly apply such speech recognition techniques, which do not take account of the influence given by accompaniment sounds, to commercially available compact disc (CD) recordings or digital music data delivered via a telecommunication network such as the Internet.

One of the studies is directed to vocals accompanied by instrumental sounds and is described in "LyricAlly: Automatic Synchronization of Acoustic Musical Signals and Textual Lyrics" written by Ye Wang, et al. in the proceedings of the 12th ACM International Conference on Multimedia held on 10-15 Oct. 2004 (hereinafter referred to as Non-Patent Reference #1). In this study, the time length of each phoneme duration is learned and vocals are allocated to a plurality of sections (Refer to Non-Patent Reference #1). The technique described in this reference utilizes higher-level information such as beat tracking and detected chorus sections. However, the technique does not take phonologic features (e.g. vowels and consonants) into consideration. As a result, the accuracy is not so high. Due to tight restrictions to the beat and tempo, this technique is not applicable to many kinds of music.

Japanese Patent Publication No. 2001-117582 (hereinafter referred to as Patent Reference #1) discloses a technique of aligning a sequence of phonemes for singing voice or vocals of a user with a sequence of phonemes for vocals of a particular singer using alignment means in Karaoke equipment. However, Patent Reference #1 does not disclose a technique of making temporal alignment between vocal audio signals and lyrics.

Japanese Patent Publication No. 2001-125562 (hereinafter referred to as Patent Reference #2) discloses a technique of extracting a dominant sound audio signal from a mixed sound audio signal including vocals and accompaniment sounds by estimating the pitch of the most dominant sound including a vocal at each time. This technique allows extracting a dominant sound audio signal with reduced accompaniment sounds from the music audio signal.

Further, a technique of reducing accompaniment sounds as is disclosed in Patent Reference #2 is also disclosed in the document entitled "Singer identification based on accompaniment sound reduction and a reliable frame selection" written by Hiromasa Fujihara, Hiroshi Okuno, Masataka Goto. et al. in the Journal Vol. 47, No. 6 of Information Processing Society of Japan, in June 2006 (hereinafter referred to as Non-Patent Reference #2). This document also discloses a technique of extracting a vocal section and a non-vocal section from dominant sound audio signals, using two Gaussian mixture models (GMM) that have learned vocals and non-vocals. The document additionally discloses that LPC-derived mel cepstral coefficients are used as vocal features.

In order to display lyrics that are exactly synchronized with accompaniment sounds, based on the music audio signal comprising human voices (e.g. vocals) and non-human sounds (e.g. accompaniment sounds) as well as lyric information, lyrics having time information are required. In other words, lyrics must be accompanied by time information that indicates how many seconds have elapsed since the start time of music performance at the time that a particular word of the lyrics should be uttered. In the specification, it is referred to as "lyrics tagged with time information".

It is easy to obtain lyrics in a form of text data, or digital information in a text form. A technique has been demanded that allows fully-automated generation of "lyrics tagged with time information" using "lyric text data" and "music audio signal including vocals uttering the lyrics" (digital music data), with practical accuracy.

Speech recognition is useful in temporally aligning lyrics with a music audio signal including accompaniment sounds. However, the inventors of the present invention have studied and found that a section in which vocals are absent (hereinafter referred to as "non-utterance section" or "non-vocal section") has adverse influence, thereby significantly reducing the accuracy of temporal alignment.

Accordingly, an object of the present invention is to provide an automatic system for temporal alignment between a music audio signal and lyrics, which is capable of controlling the influence of the non-vocal section to reduce the accuracy of temporal alignment, and to provide a method of making the temporal alignment and a computer program used in the system for this purpose.

BRIEF DESCRIPTION OF THE DRAWINGS

FIG. 3 is a flowchart showing the steps of reducing accompaniment sounds.

FIG. 5 is a block diagram illustrating a specific configuration of vocal-section estimation means.

FIG. 6 is a flowchart showing the steps of implementing the vocal section estimation means of FIG. 5 by running the computer program.

FIG. 7 is a flowchart showing the steps of implementing detection of a vocal section by running the computer program.

FIG. 9 tabulates analysis conditions for Viterbi alignment.

FIG. 17 is an illustration used to explain evaluation criteria.

FIG. 19A shows accuracy percentages of alignment in respect of individual musical pieces in respective conditions. FIG. 19B tabulates the accuracy percentages in respective conditions.

SUMMARY OF THE INVENTION

Figure 1:
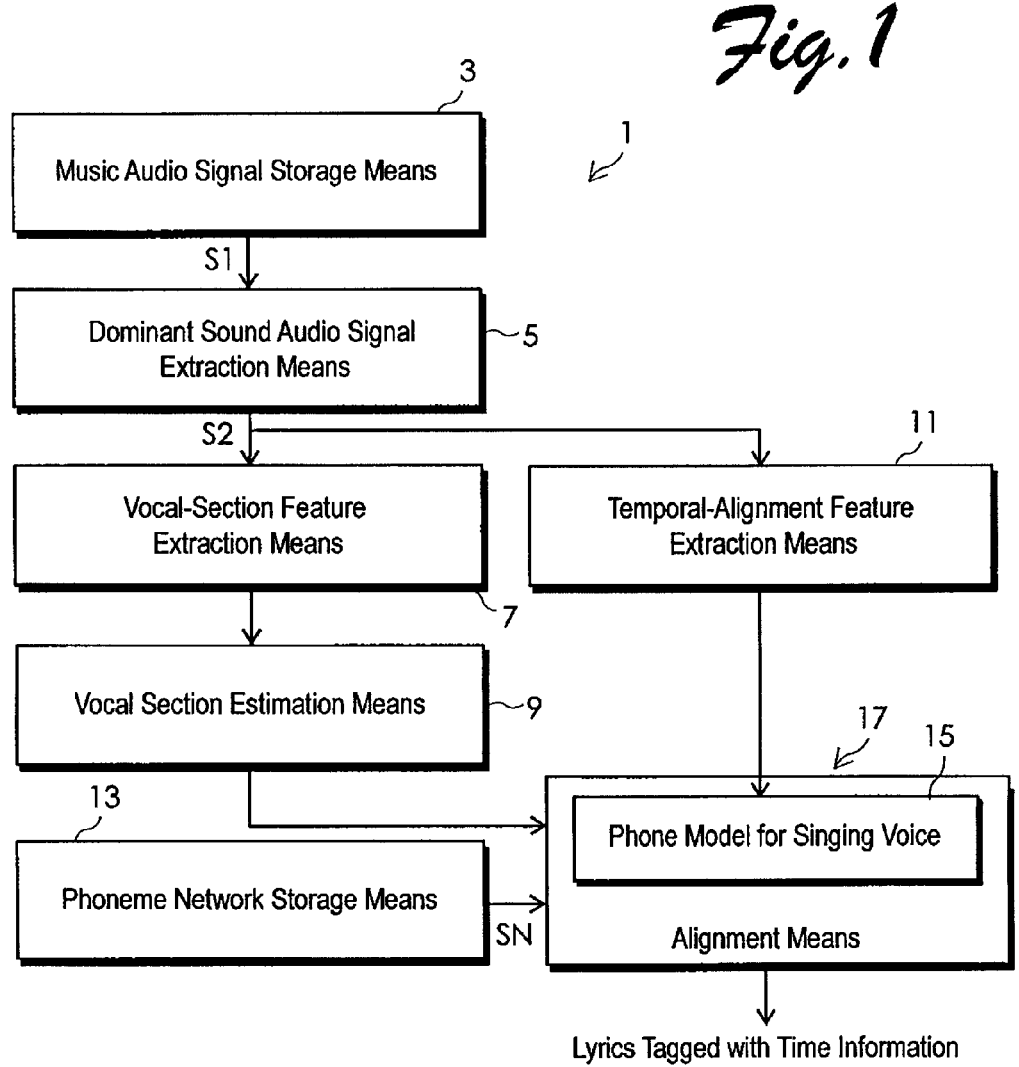
FIG. 1 is a block diagram illustrating a configuration of function implementation means when an automatic system for temporal alignment between a music audio signal and lyrics according to the present invention is embodied in a computer.

An automatic system for temporal alignment between a music audio signal and lyrics according to the present invention comprises dominant sound audio signal extraction means, vocal-section feature extraction means, vocal section estimation means, temporal-alignment feature extraction means, phoneme network storage means, and alignment means.

The dominant sound audio signal extraction means extracts, from a music audio signal of music including vocals and accompaniment sounds, a dominant sound audio signal of the most dominant sound including the vocal at each time (e.g. every 10 msec). The technique of extracting the dominant sound audio signal is the same as the one disclosed in Patent Reference #2 and Non-Patent Reference #2 described before.

The vocal-section feature extraction means extracts a vocal-section feature available to estimate a vocal section which includes the vocal and a non-vocal section which does not include the vocal, from the dominant sound audio signal at each time (e.g. every 10 msec). The vocal-section feature available to estimate a vocal section is typically the 13th order feature. More specifically, LPC-derived mel cepstral coefficients and a derivative $\Delta F0$ of the fundamental frequency $F0$ may be used as spectral features for vocal/non-vocal state discrimination.

The vocal section estimation means estimates the vocal section and the non-vocal section, based on a plurality of the vocal-section features, and outputs information on the vocal section and the non-vocal section.

The temporal-alignment feature extraction means extracts a temporal-alignment feature suitable to make temporal alignment between lyrics of the vocal and the music audio signal from the dominant sound audio signal at each time. Specifically, In an embodiment of the present invention, the 25th order features such as a resonance property of the phoneme may be used as temporal-alignment features.

The features extracted by the vocal-section feature extraction means and those extracted by the temporal-alignment feature extraction means may be stored respectively in storage portions provided in the vocal-section feature extraction means and the temporal-alignment feature extraction means. The extracted features for at least one musical piece may be stored in the storage portions, and then may later be used for various processing.

The phoneme network storage means stores a phoneme network constituted from a plurality of phonemes and short pauses in respect of lyrics of the music corresponding to the music audio signal. For example, lyrics are converted into a sequence of phonemes, phrase boundaries are converted into a plurality of short pauses, and a word boundary is converted into one short pause. Thus, a phoneme network is constituted. Preferably, Japanese lyrics may be converted into a sequence of phonemes including only vowels and short pauses. Preferably, English lyrics may be converted into a sequence of phonemes including English phonemes and short pauses.

The alignment means is provided with a phone model for singing voice that estimates a phoneme corresponding to the temporal-alignment feature, based on the temporal-alignment feature. The alignment means performs an alignment operation that makes temporal alignment between the plurality of phonemes in the phoneme network and the dominant sound audio signals. Specifically, the alignment means receives the temporal-alignment feature outputted from the temporal-alignment feature extraction means, the information on the vocal section and the non-vocal section, and the phoneme network, and performs the alignment operation using the phone model for singing voice on condition that no phoneme exists at least in the non-vocal section. Thus, temporal alignment is automatically made between the music audio signal and lyrics.

According to the present invention, the vocal-section features, or the features suitable to estimate the vocal and non-vocal sections, and the temporal-alignment features, or the features suitable for temporal alignment between the music audio signal and lyrics are separately extracted from the dominant sound audio signals, thereby increasing the accuracy for estimating the vocal/non-vocal sections, and the accuracy for temporal alignment. Especially, in the present invention, the alignment means does not use a phone model for speaking voice or speech, but uses a phone model for singing voice that estimate phonemes corresponding to temporal-alignment features. Thus, highly accurate estimation of phonemes may be performed with consideration given to the features of singing voice different from speaking voice. Since the alignment means performs the alignment operation on condition that no phoneme exists at least in the non-vocal section, temporal alignment may be made between a plurality of phonemes in the phoneme network and the dominant sound audio signals at respective times with the influence of the non-vocal section being precluded as much as possible. Therefore, according to the present invention, lyric data tagged with time information that is synchronized with the music audio signal may automatically be generated using an output from the alignment means.

The vocal section estimation means may arbitrarily be configured, provided that high estimation accuracy should be attained. For example, the vocal section estimation means may include Gaussian model storage means for storing a plurality of Gaussian mixture models or Gaussian mixture distributions for vocals and non-vocals obtained in advance by training or teaching based on a plurality of training or teaching musical pieces. The vocal section estimation means may be configured to estimate the vocal section and the non-vocal section, based on the plurality of vocal-section features extracted from the music audio signal and the plurality of Gaussian mixture models. Thus, based on the Gaussian mixture models obtained in advance by training or teaching, the vocal and non-vocal sections may be estimated with high accuracy, thereby increasing alignment accuracy in the alignment means.

The vocal section estimation means may include log likelihood calculation means, log likelihood difference calculation means, histogram creation means, bias correction value determination means, estimation parameter determination means, weighting means, and most likely route calculation means. The log likelihood calculation means calculates a vocal log likelihood and a non-vocal log likelihood at each time, based on the vocal-section features and the Gaussian mixture models at respective times. The log likelihood difference calculation means calculates a log likelihood difference between the vocal log likelihood and the non-vocal log likelihood at each time. The histogram creation means creates a histogram relating to a plurality of log likelihood differences obtained over the whole period of the music audio signal, in the pre-processing prior to estimation. The bias correction value determination means defines a threshold to maximize between-class variance, and determines the threshold as a music-dependent bias correction value when the histogram is divided into two music-dependent classes, the log likelihood differences in the vocal sections and those in the non-vocal sections. The estimation parameter determination means determines an estimation parameter used to estimate a vocal section by adding a task-dependent value to the bias correction value in order to correct the bias correction value, or to increase alignment accuracy or adjust to broaden the vocal section. The weighting means weights the vocal log likelihood and the non-vocal log likelihood at each time using the estimation parameter. The vocal log likelihood and non-vocal log likelihood that have been obtained in the pre-processing prior to the estimation may be used in weighting, but they may newly be calculated. When those obtained in the pre-processing are used, the log likelihood calculation means may have a storage function. The most likely route calculation means defines the weighted vocal log likelihoods and the weighted non-vocal log likelihoods that are obtained over the whole period of the music audio signal as an output probability of a vocal state ($S_V$) and an output probability of a non-vocal state ($S_N$) in a Hidden Markov Model, respectively. Then, the most likely route calculation means calculates the most likely routes for the vocal state and the non-vocal state over the whole period of the music audio signal, and determines, based on the most likely routes, information on the vocal and non-vocal sections over the whole period of the music audio signal. The log likelihood difference calculation means, the histogram creation means, the bias correction value determination means, and the estimation parameter determination means are implemented on the music audio signal in the pre-processing prior to estimating vocal sections in the system of the present invention. When the vocal log likelihood and the non-vocal log likelihood at each time are weighted by the weighting means using estimation parameters obtained in the pre-processing, it is possible to properly control adjusting the boundaries between the vocal and non-vocal sections in the most likely route calculation means. During the estimation, the most likely route is calculated from the vocal-section features outputted by the vocal-section feature extraction means at each time, by directly weighting the vocal and non-vocal log likelihoods calculated by the log likelihood calculation means. A bias correction value suitable for a particular music audio signal may be determined by defining the bias correction value for the vocal and non-vocal log likelihoods using the histogram of log likelihood differences created in the pre-processing. The bias correction value (threshold value) determines a boundary portion between the vocal and non-vocal states. Weighting using the estimation parameters determined based on the bias correction value allows adjustment of the vocal and non-vocal log likelihoods around the boundary between the vocal and non-vocal states, following a tendency of vocal-section features appearing due to differences in audio properties of a music audio signal for each musical piece. Consequently, boundaries between the vocal and non-vocal sections may properly be determined for individual musical pieces.

The most likely route calculation means calculates the most likely route as follows. Specifically, the output log probability of log $p(x|S_V)$ for the vocal state ($S_V$) and the output log probability of log $p(x|S_N)$ for the non-vocal state ($S_N$) are approximated with the following equations:

$$\log p(x|s_V) = \log N_{GMM}(x; \theta_V) - \frac{1}{2}\eta$$

$$\log p(x|s_N) = \log N_{GMM}(x; \theta_N) + \frac{1}{2}\eta$$

where $N_{GMM}(X;\theta_V)$ stands for the probability density function of Gaussian mixture model (GMM) for vocals, $N_{GMM}(X;\theta_N)$ for the probability density function of Gaussian mixture model (GMM) for non-vocals, $\theta_V$ and $\theta_N$ are parameters determined in advance by training or teaching based on the plurality of training or teaching musical pieces, and $\eta$ is the estimation parameter.

The most likely route may be calculated with the following equation:

$$\hat{S} = \underset{S}{\mathrm{argmax}} \sum_t \{\log p(x|s_t) + \log p(s_{t+1}|s_t)\}$$

where $p(x|S_t)$ stands for an output probability for a state $S_t$ and $p(S_{t+1}|S_t)$ for a transition probability from a state $S_t$ to a state $S_{t+1}$.

More accurate information on the vocal and non-vocal sections over the whole period of the music audio signal may be obtained by calculating the most likely route with the above-identified equation.

The alignment means may be configured to perform an alignment operation using Viterbi alignment. "Viterbi alignment" is known in the field of speech recognition, and is one of the techniques of searching an optimal solution to identify the most likely route between a music audio signal and grammar (a sequence of phonemes for alignment) using the Viterbi algorithm. The Viterbi alignment is performed on condition that no phoneme exists in the non-vocal section, at least the non-vocal section is defined as a short pause, and likelihoods for other phonemes in the short pause are set to zero. In this manner, the likelihoods for other phonemes are set zero in the short pause sections, and accordingly the information on the vocal sections can be utilized, thereby attaining highly accurate alignment.

As the phone model for singing voice, a phone model may be used, which is obtained by re-estimating (through training or teaching) parameters of a phone model for speaking voice so as to recognize vocal phonemes in the music including vocals and accompaniment sounds. Ideally, a phone model, which has been trained or taught using a large amount of training or teaching vocal data, may be used for alignment of uttered singing (lyrics). At the present, however, such training or teaching vocal database has not been built up. Instead, a phone model may be used, which is obtained by re-estimating (through training or teaching) parameters of a phone model for speaking voice or speech so as to recognize vocal phonemes in the music including vocals and accompaniment sounds. With this, the vocal phonemes may be recognized with higher accuracy than when a phone model for speaking voice is used.

Alternatively, a phone model for vocals without accompaniment sounds may be used, which is obtained by re-estimating parameters of the phone model for speaking voice, using a music audio signal for adaptation to vocals without accompaniments and phoneme labels for adaptation corresponding to the music audio signal for adaptation, so as to recognize vocal phonemes from the music audio signal for adaptation. The phone model of this type is suitable for vocals without accompaniments and vocals with accompaniments smaller than the vocals.

Alternatively, a phone model for segregated vocals may be used, which is obtained by re-estimating parameters of the phone model for vocals without accompaniments, using dominant sound music audio signals of the most dominant sounds including the vocals extracted from the music audio signal for adaptation including vocals as well as accompaniment sounds, and phoneme labels for adaptation corresponding to the dominant sound music audio signals, so as to recognize vocal phonemes from the dominant sound music audio signals. The phone model of this type is suitable for vocals with as large accompaniment sounds as the vocals.

Alternatively, a phone model of a particular singer may be used, which is obtained by re-estimating parameters of the phone model for segregated vocals, using the temporal-alignment features stored in the temporal-alignment feature extraction means and the phoneme network stored in the phoneme network storage means, so as to recognize vocal phonemes of a particular singer singing the music of the music audio signal inputted into the music audio signal extraction means. The phone model for a particular singer may increase alignment accuracy since it is directed to a particular singer.

In a music audio signal reproducing apparatus which reproduces a music audio signal while displaying on a screen lyrics temporally aligned with the music audio signal to be reproduced, if the system of the present invention is used to display lyrics temporally aligned with the music audio signal, lyrics which is synchronized with music to be played back can be displayed on the screen.

According to the present invention, a method of automatically making temporal alignment between a music audio signal and lyrics is implemented as follows. First, dominant sound audio signal extraction means extracts, from a music audio signal of music including vocals and accompaniment sounds, a dominant sound audio signal of the most dominant sound including the vocal at each time (in the dominant sound audio signal extraction step). Next, vocal-section feature extraction means extracts a vocal-section feature available to estimate a vocal section which includes the vocal and a non-vocal section which does not include the vocal, from the dominant sound audio signal at each time (in the vocal-section feature extraction step). Then, vocal section estimation means estimates the vocal section and the non-vocal section, based on a plurality of the vocal-section features and outputs information on the vocal section and the non-vocal section (in the vocal section estimation step). Next, temporal-alignment feature extraction means extracts a temporal-alignment feature suitable to make temporal alignment between lyrics of the vocal and the music audio signal from the dominant sound audio signal at each time (in the temporal-alignment feature extraction step). Further, a phoneme network is stored in phoneme network storage means (in the storage step). The phoneme network is constituted from a plurality of phonemes corresponding to the music audio signal and temporal intervals between two adjacent phonemes are connected in such a manner that the temporal intervals can be adjusted. Then, alignment means is provided with a phone model for singing voice that estimates a phoneme corresponding to the temporal-alignment feature, based on the temporal-alignment feature, and performs an alignment operation that makes the temporal alignment between the plurality of phonemes in the phoneme network and the dominant sound audio signals (in the alignment step). In the alignment step, the alignment means receives the temporal-alignment feature obtained in the step of extracting the temporal-alignment feature, the information on the vocal section and the non-vocal section, and the phoneme network, and performs the alignment operation on condition that no phoneme exists at least in the non-vocal section.

According to the present invention, when a computer is used to make temporal alignment between lyrics and a music audio signal of music including vocals and accompaniment sounds, the computer may be identified as a program which implements the dominant sound audio signal extraction means, the vocal-section feature extraction means, the vocal section estimation means, the temporal-alignment feature extraction means, the phoneme network storage means, and the alignment means. The computer program may be stored in a computer-readable recording medium.

In a music audio signal reproducing apparatus which reproduces a music audio signal while displaying on a screen lyrics temporally aligned with the music audio signal to be reproduced, the computer program of the present invention can be run for temporal alignment between a music audio signals and lyrics. The lyrics are displayed on a screen after the lyrics have been tagged with time information. When the lyrics are displayed on the screen, a portion of the displayed lyrics is selected with a pointer. In this manner, the music audio signal may be reproduced from that point, based on the time information corresponding to the selected lyric portion. Alternatively, lyrics tagged with time information is generated in advance by the system of the present invention may be stored in storage means such as a hard disc provided in a music audio signal reproducing apparatus, or may be stored in a server over the network. The lyrics tagged with time information that have been acquired from the storage means or the server over the network may be displayed on the screen in synchronization with music digital data reproduced by the music audio signal reproducing apparatus.

BEST MODE FOR IMPLEMENTING THE INVENTION

Figure 2:
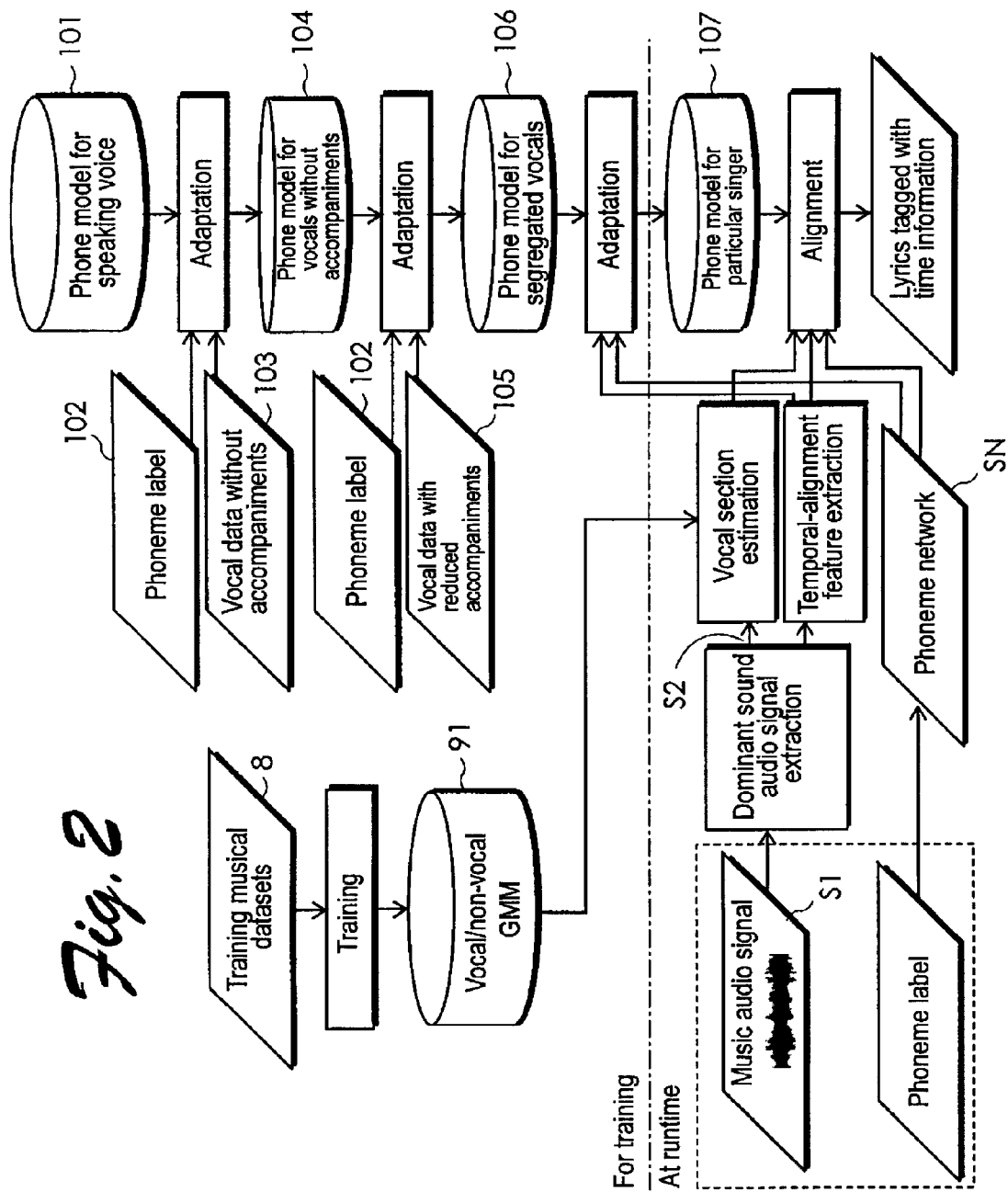
FIG. 2 is a flowchart showing the steps of implementing the system of FIG. 1 by running a program in the computer.

Now, an embodiment of an automatic system for temporal alignment between a music audio signal and lyrics and a method therefore according to the present invention will be described in detail with reference to accompanying drawings. FIG. 1 is a block diagram illustrating a configuration of function implementation means when an automatic system for temporal alignment between a music audio signal and lyrics according to the present invention is embodied in a computer. FIG. 2 is a flowchart showing the steps of implementing the system of FIG. 1 by running a program in the computer. The system 1 comprises music audio signal storage means 3, dominant sound audio signal extraction means 5, vocal-section feature extraction means 7, vocal section estimation means 9, temporal-alignment feature extraction means 11, phoneme network storage means 13, and alignment means 17 provided with a phone model 15 for singing voice.

The fundamental approach of the present invention for effectively attaining the technical challenges described above primarily consists of the following three steps:

Step 1: Accompaniment sound reduction
Step 2: Vocal section detection (The technique of detecting a vocal section is generally called as "Vocal Activity Detection.)
Step 3: Alignment (Temporal alignment)

Figure 4A:
FIGS. 4A to 4D are respectively waveforms used to explain the process in which a dominant sound audio signal is extracted from the music audio signal.
Figure 4B:
Figure 4C:
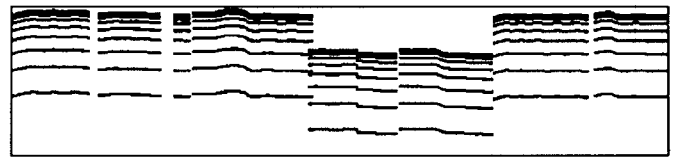
Figure 4D:

To execute Step 1, the music audio signal storage means 3 stores music audio signals of a plurality of musical pieces including vocals and accompaniment sounds, which are targets for temporal alignment. As shown in the flowchart of FIG. 3, the dominant sound audio signal extraction means 5 extracts a dominant sound audio signal S2 of the most dominant sound including a vocal at each time (specifically, every 10 msec.) from a music audio signal S1 of the music including vocals and accompaniment sounds. In this embodiment, a dominant sound audio signal may be understood as a signal with reduced accompaniment sounds. A technique of extracting the dominant sound audio signal is the same as those disclosed in Japanese Patent Publication No. 2001-125562 (Patent Reference #2) and Non-Patent Reference #2. A typical waveform of the music audio signal S1 including vocals and accompaniment sounds is shown in FIG. 4A. A typical waveform of the dominant sound audio signal S2 with reduced accompaniment sounds, outputted from the dominant sound audio signal extraction means 5, is shown in FIG. 4D. The dominant sound audio signal is extracted as follows.

First, to extract a vocal-section feature and a temporal-alignment feature (phonologic features of a melody line or vocals) from a music audio signal including vocals and accompaniment sounds (mixed sounds), it is necessary to obtain a dominant sound audio signal with the influence of accompaniment sounds being reduced from the music audio signal. Then, the dominant sound audio signal extraction means 5 implements the following three steps as shown in FIG. 3.

ST1: Estimating the fundamental frequency F0 of the melody line (vocal)
ST2: Extracting the harmonic structure of the melody line (vocal) based on the estimated fundamental frequency ST3: Resynthesizing the extracted harmonic structure into a dominant sound audio signal The dominant sound audio signal may sometimes include a non-vocal audio signal such as an audio signal of an accompaniment sound or no sound in an interlude section. In this embodiment, therefore, it is more appropriate to say that accompaniment sounds are not "removed" but "reduced."
(ST1: Estimation of F0)

Various techniques of estimating the fundamental frequency of the melody line (vocal) are known. For example, as described in "Estimation for the predominant fundamental frequency of melody and bass lines in real-world audio signals" written by Masataka Goto, in the journal of the Institute of Electronics, Information and Communication Engineers, D-II, Vol. J84-D-II, No. 1, pp. 12-22, January 2001, Goto's estimation of predominant fundamental frequency F0 (PreFest), which does not assume the number of sound sources, may be used to estimate the fundamental frequency. PreFEst is known as a technique of estimating the fundamental frequency F0 of the melody and bass lines. Specifically, PreFEst estimates the fundamental frequency F0 of a dominant sound having the most dominant harmonic structure or the most largest sound at each time within a limited frequency band. PreFest prepares a probability model or distribution representing the shape of the harmonic structure of every pitch or fundamental frequency. Then, modeling of the input frequency component into a mixture distribution model (weighted mixture=weighted summation) is done.

In a high- or middle-frequency band, the melody line (vocal) tends to have the most dominant harmonic structure at each time. The fundamental frequency F0 of the melody line may be estimated by appropriately limiting the frequency band. PreFEst will be briefly described below. In the description, x stands for a frequency on the log-scale frequency axis, expressed in units of cent, and (t) for discrete time. Although the unit of cent originally denotes a tone interval or relative pitch, it is used in the specification of the present disclosure as a unit of absolute pitch using $440 \times 2^{\{(3/12)-5\}}$ [Hz] as a reference, as shown below.

$$f_{cent} = 1200 \log_2 \frac{f_{Hz}}{440 \times 2^{\frac{3}{12}-5}}$$

Given the power spectrum $\Psi_p^{(t)}(x)$, a band-pass filter (BPF) is applied, which is designed to allow most of the frequency components of the melody line to pass therethrough. It is preferable to use a filter allowing frequency components of 4800 cents or more to pass therethrough. The filtered frequency components are represented by $BPF(x) \cdot \Psi_p^{(t)}(x)$ where $BPF(x)$ is BPF's frequency response. Hereinafter, to enable probability processing, each of the band-pass filtered frequency components are represented as a probability density function (PDF) as follows:

$$p_\Psi^{(t)}(x) = \frac{BPF(x)\Psi_p^{(t)}(x)}{\int_{-\infty}^{\infty} BPF(x)\Psi_p^{(t)}(x)dx}$$

Then, it is considered that the probability density function PDF of the frequency component has been generated from a weighted-mixture model for tone models of all the possible fundamental frequencies F0s. The weighted-mixture model is represented as follows:

$$p(x \mid \theta^{(t)}) = \int_{F1}^{Fh} w^{(t)}(F)p(x \mid F)dF,$$

$$\theta^{(t)} = \{w^{(t)}(F) \mid F1 \le F \le Fh\}$$

where p(x|F) stands for a tone model of each F0, Fh for the upper limit of the allowable F0 range, Fl for the lower limit of the allowable F0 range, and $w^{(t)}(F)$ for a weight for the tone model which satisfies the following equation:

$$\int_{Fh}^{F1} w^{(t)}(F)dF = 1$$

A tone model is a probabilistic model representing a typical harmonic structure. Then, $w^{(t)}(F)$ is estimated using the EM (Expectation Maximization) algorithm, and the estimated $w^{(t)}(F)$ is interpreted as the probability density function (PDF) of the fundamental frequency F0. Finally, F0 estimation of the melody line (vocal) is accomplished by tracking a dominant peak trajectory of F0 from $w^{(t)}(F)$ using a multi-agent model. FIGS. 4A to 4D respectively show waveforms (F0 estimation) thus obtained.

(ST2: Harmonic Structure Extraction)

Based on the estimated F0, the power of each harmonic component in the harmonic structure of the melody line is extracted. For each component, r cent error is allowed around the peak, and then a peak having the strongest power is extracted in the allowed area. The power $A_l$ and frequency $F_l$ of the overtone l(l=1, . . . , L) may be represented as:

$$F_l = \underset{F}{\mathrm{argmax}} |S(F)| \left( \left( \bar{F} \cdot \left(1 - 2^{\frac{r}{1200}}\right) \le F \le \bar{F} \cdot \left(1 + 2^{\frac{r}{1200}}\right) \right) \right)$$

$$A_l = |S(F_l)|$$

where S(F) denotes the spectrum, a symbol with a bar (−) indicated above the letter F denotes the fundamental frequency F0 estimated by PreFEst. In the experiments carried out by the inventors, r was set to 20 and the harmonic structure was extracted. The results have been confirmed as described later. FIG. 4C shows a harmonic structure of each of extracted fundamental frequencies.

(ST3: Resynthesis)

The dominant audio signal of the most dominant sound including the vocal at each time is obtained by resynthesizing the extracted harmonic structure based on the a sinusoidal model. The frequency and amplitude of the lth overtone at time t are respectively defined as $F_l^{(t)}$ and $A_l^{(t)}$. Phase change is approximated using a quadratic function so that a frequency may linearly change between frames at time t and time t+1. Amplitude change between frames is approximated using a linear function. The resynthesized dominant sound audio signal S(K) is represented as:

$$\theta_l(k) = \frac{\pi(F_l^{(t+1)} - F_l^{(t)})}{F}k^2 + 2\pi F_l^{(t)}k + \theta_{l,0}^{(t)}$$

$$s_l(k) = \left\{(A_l^{(t+1)} - A_l^{(t)})\frac{k}{K} + A_l^{(t)}\right\}\sin(\theta_l(k))$$

$$s(k) = \sum_{l=1}^{L} s_l(k)$$

where $\theta_l(k)$ denotes the phase of the lth overtone at time k and $S_l(k)$ denotes the waveform of the lth overtone at time k. Lowercase k stands for time in units of seconds. At time k, k=0. Uppercase K stands for a time difference between time k and time k+1, namely, a frame shift in units of seconds. $\theta_{l,0}^{(t)}$ denotes the initial value of the phase. In the first or leading frame of the input signal, $\theta_{l,0}^{(t)}=0$. In the subsequent frames, $\theta_{l,0}^{(t)}$ is represented using the frequency of the lth overtone $F_l^{(t-1)}$ in the previous frame and the initial phase value of $\theta_{l,0}^{(t-1)}$ in the previous frame as:

$$\frac{\pi(F_l^{(t)} - F_l^{(t-1)})}{2K} + \theta_{l,0}^{(t-1)}$$

Returning to FIG. 1, the vocal-section feature extraction means 7 extracts a vocal-section feature available to estimate a vocal section which includes the vocal and a non-vocal section which does not include the vocal, from the dominant sound audio signal at each time, specifically every 10 msec. In this embodiment, the 12th order LPC-derived mel cepstral coefficients (LPMCC) and a derivative ΔF0 of the fundamental frequency F0 are used as available vocal-section features. In this embodiment, the vocal-section feature extraction means 7 extracts two kinds of features as vocal-section features (spectral features) available for vocal/non-vocal discrimination as described below.

LPC-Derived Mel Cepstral Coefficient (LPMCC):

One of the two kinds of features is the 12th order LPC-derived mel cepstral coefficient (LPMCC). LPMCC is a coefficient calculated from the LPC spectrum. The experiments carried out by the inventors of the present invention have confirmed that LPMCC represents the characteristics of the vocals or singing voice better than a mel frequency cepstral coefficient (MFCC). In this embodiment, the LPC-derived mel cepstral coefficient (LPMCC) is extracted by calculating the mel frequency cepstral coefficient MFCC from the LPC spectrum. $\Delta F0_S$:

The other of the two kinds of features is a derivative ΔF0 of the fundamental frequency F0. This is useful in representing dynamic properties of the singing voice or vocals. A derivative ΔF0 represents an inclination of the fundamental frequency F0 trajectory. It is commonly considered that singing voice tends to have temporal variation of F0 due to vibrato and, therefore, is expected to be a good cue for vocal/non-vocal discrimination.

As shown below, a regression parameter over five frames is used in calculating ΔF0.

$$\Delta f[t] = \frac{\sum_{k=-2}^{2} k \cdot f[t+k]}{\sum_{k=-2}^{2} k^2}$$

where f[t] denotes a frequency in units of cent at time t.

To execute Step 2 of the fundamental approach of the present invention described before, the vocal section estimation means 9 estimates the vocal section and the non-vocal section, based on a plurality of the vocal-section features extracted at respective times, and outputs information on the vocal section and the non-vocal section. The vocal section estimation means 9 of this embodiment is configured as shown in FIG. 5. The vocal section estimation means 9 of FIG. 5 is provided with Gaussian mixture model storage means 91 for storing a plurality of Gaussian mixture models or distributions of vocals and non-vocals which have been obtained in advance by training or teaching based on the a plurality of training or teaching musical datasets, as shown in FIG. 2. The vocal section estimation means 9 estimates vocal and non-vocal sections based on the vocal-section features and Gaussian mixture models or distributions over the whole period of the music audio signal S1 of one musical piece, and then outputs information on the vocal and non-vocal sections. The vocal section estimation means 9 may include log likelihood calculation means 92, log likelihood difference calculation means 93, histogram creation means 94, bias correction value determination means 95, estimation parameter determination means 96, weighting means 97, and most likely route calculation means 98. The log likelihood difference calculation means 93, the histogram creation means 94, the bias correction value determination means 95, and the estimation parameter determination means 96 are executed in pre-processing prior to estimation of the vocal section. FIG. 6 is a flowchart showing the steps of implementing the vocal section estimation means 9 of FIG. 5 by running the computer program. FIG. 7 is a flowchart showing the steps of implementing detection of a vocal section by running the computer program. FIG. 7 corresponds to details of steps ST11 and ST16.

The log likelihood calculation means 92 calculates a vocal log likelihood and a non-vocal log likelihood at each time over the whole period from the start to the end of the music audio signal S1, based on the vocal-section features extracted by the vocal-section feature extraction means 7 (in step ST11) and the Gaussian mixture models or distributions at respective times stored in the Gaussian mixture model storage means 91 in the pre-processing.

The log likelihood difference calculation means 93 calculates a log likelihood difference between the vocal log likelihood and the non-vocal log likelihood at each time (in step ST12). A log likelihood difference l(x) between the vocal log likelihood and the non-vocal log likelihood is calculated in respect of the vocal-section features (a sequence of feature vectors) extracted from the input music audio signal.

$$l(x) = \log N_{GMM}(x; \theta_V) - \log N_{GMM}(x; \theta_N)$$

where the first function denotes the vocal log likelihood and the second function denoted the non-vocal log likelihood.

The histogram creation means 94 creates a histogram relating to a plurality of log likelihood differences obtained from dominant sound audio signals extracted over the whole period of the music audio signal, in the pre-processing prior to estimation (in step ST13). FIG. 6 shows an example of histogram created by the histogram creation means 94.

The bias correction value determination means 95 defines a threshold to maximize between-class variance, and determines the threshold as a music-dependent bias correction value $\eta_{dyn.}$ when the histogram is divided into two music-dependent classes, the log likelihood differences in the vocal sections and those in the non-vocal sections (in step ST14). FIG. 6 illustrates the threshold value. The estimation parameter determination means 96 determines an estimation parameter $\eta$ ($\eta = \eta_{dyn.} + \eta_{fixed}$) used in estimating a vocal section by adding a task-dependent value $\eta_{fixed}$ to the bias correction value $\eta_{dyn.}$ in order to correct the bias correction value $\eta_{dyn.}$, or to increase alignment accuracy or adjust to broaden the vocal section (in step ST15). Since the likelihood for Gaussian mixture model (GMM) is biased depending upon the musical piece, it is difficult to universally define an estimation parameter $\eta$ suitable to all of the musical pieces. In this embodiment, the estimation parameter $\eta$ is divided into the bias correction value $\eta_{dyn.}$ and the task-dependent value $\eta_{fixed}$. The task-dependent value $\eta_{fixed}$ is manually determined, considering the kind or type of each musical piece. The bias correction value $\eta_{dyn.}$ may be automatically determined for each musical piece through the steps described above or by publicly known existing techniques of automatically determining the threshold. Alternatively, the bias correction value may be determined in advance based on typical music audio signals for training or teaching, depending upon the kind or type of the music.

The weighting means 97 weights the vocal log likelihood and the non-vocal log likelihood at each time using the estimation parameter $\eta$ (in step ST16A of FIG. 7). In this example, the vocal log likelihood and non-vocal log likelihood that have been obtained in the pre-processing prior to the estimation are used in weighting. The weighting means 97 approximates output probabilities of the vocal and non-vocal log likelihoods using the following equations.

$$\log p(x|s_V) = \log N_{GMM}(x; \theta_V) - \frac{1}{2}\eta$$

$$\log p(x|s_N) = \log N_{GMM}(x; \theta_N) + \frac{1}{2}\eta$$

where $N_{GMM}(X;\theta)$ stands for the probability density function of Gaussian mixture model (GMM), and $\eta$ is the estimation parameter to adjusting the relationship of a hit rate and a correct rejection rate. A parameter $\theta_V$ for vocal GMM and a parameter $\theta_N$ for non-vocal GMM are determined using vocal and non-vocal sections of the training or teaching musical datasets. A GMM having the mixture number of 64 was used in the experiments carried out by the inventors of the present invention, and the experiments have confirmed the effect of this GMM model.

Figure 8:
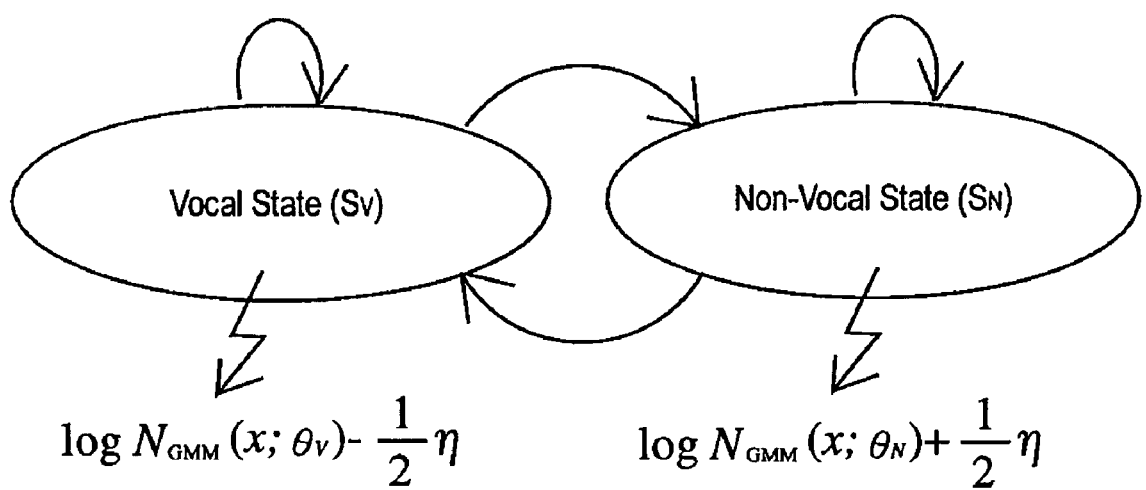
FIG. 8 is an illustration used to explain a Hidden Markov Model (HMM) transitioning back and forth between a vocal state ($S_V$) and a non-vocal state ($S_N$).

The most likely route calculation means 98 defines the weighted vocal log likelihoods and the weighted non-vocal log likelihoods which are obtained over the whole period of the music audio signal as an output probability of a vocal state ($S_V$) and an output probability of a non-vocal state ($S_N$) in a Hidden Markov Model, respectively (in step ST16B). Then, the most likely route calculation means 98 calculates the most likely routes for the vocal state and the non-vocal state over the whole period of the music audio signal (in step ST16C), and determines, based on the most likely routes, information on the vocal and non-vocal sections over the whole period of the music audio signal. As shown in FIG. 8, a Hidden Markov Model (HMM) transitioning back and forth between the vocal and non-vocal states, $S_V$ and $S_N$ is used in calculating the most likely route. The vocal state literally means "vocals are present" and the non-vocal state literally means "vocals are absent." Here, the most likely route is represented as:

$$\hat{S} = \{\hat{S}_1, \ldots, \hat{S}_t, \ldots\}$$

The most likely route calculation means 98 searches the most likely route for a feature spectral sequence extracted from the input music audio signal using the following equation.

$$\hat{S} = \underset{S}{\operatorname{argmax}} \sum_{t} \{\log p(x \mid s_t) + \log p(s_{t+1} \mid s_t)\}$$

where $p(x|S_t)$ stands for an output probability of the state and $p(S_{t+1}|S_t)$ for a transition probability from the state $S_{t+1}$ to the state $S_t$.

In the ordinary estimation other than pre-processing, the vocal section estimation means 9 calculates the most likely route by directly weighting the vocal and non-vocal log likelihoods calculated by the log likelihood calculation means 92 based on the vocal-section features outputted from the vocal-section feature extraction means 7 at each time. In contrast therewith, in the pre-processing described above wherein the bias correction values $\eta_{dyn}$ are determined for vocal and non-vocal log likelihoods, using the histogram of log likelihood differences, the bias correction value $\eta_{dyn}$ suitable to a particular music audio signal may be determined. Weighting using the estimation parameter $\eta$ determined based on the bias correction value $\eta_{dyn}$ thus determined allows adjustment of the vocal and non-vocal log likelihoods around the boundary between the vocal and non-vocal states, following a tendency of vocal-section features appearing due to differences in audio properties of a music audio signal for each musical piece. Consequently, boundaries between the vocal and non-vocal sections may properly be determined for individual musical pieces.

Returning to FIG. 1, the temporal-alignment feature extraction means 11 extracts a temporal-alignment feature suitable to make temporal alignment between lyrics of the vocal and the music audio signal from the dominant sound audio signal at each time. Specifically, in this embodiment, the 25th order features such as a resonance property of the phoneme are extracted as temporal-alignment features. This step is a pre-processing necessary for the subsequent alignment. Details will be described later with reference to the analysis conditions for Viterbi alignment shown in FIG. 9. The 25th order features are extracted in this embodiment, including the 12th order MFCC, the 12th order ΔMFCC, and Δ power.

The phoneme network storage means 13 stores a phoneme network SN constituted from a plurality of phonemes in connection with the lyrics of the music corresponding to the music audio signal. For example, Japanese lyrics are converted into a sequence of phonemes, phrase boundaries are converted into a plurality of short pauses, and a word boundary is converted into one short pause. Thus, the phoneme network is constituted. Preferably, Japanese lyrics may be converted into a sequence of phonemes Including only vowels and short pauses. Based on text data of given lyrics, alignment grammar is created and then defined as a sequence of phonemes for alignment.

The sequence of phonemes for alignment for Japanese lyrics includes blanks or short pauses (sp) as well as vowels and consonants only. This is because an unvoiced consonant does not have a harmonic structure and cannot be extracted by accompaniment sound reduction method, and stable estimation of the fundamental frequency F0 is hard since a voiced consonant is short when uttered. Specifically, the lyrics are directly converted into a sequence of phonemes. Substantially, this process is equivalent to converting oral readings of the lyrics into Roman characters (Romanized transliteration). Then, following two rules (Japanese grammar) as shown below, the sequence of phonemes in a form of Romanized transliteration is converted into a sequence of phonemes for alignment.

Rule 1: to convert sentence and phrase boundaries in the lyrics into a plurality of short pauses (sp).

Rule 2: to convert a word boundary into one short pause.

Figure 10A:
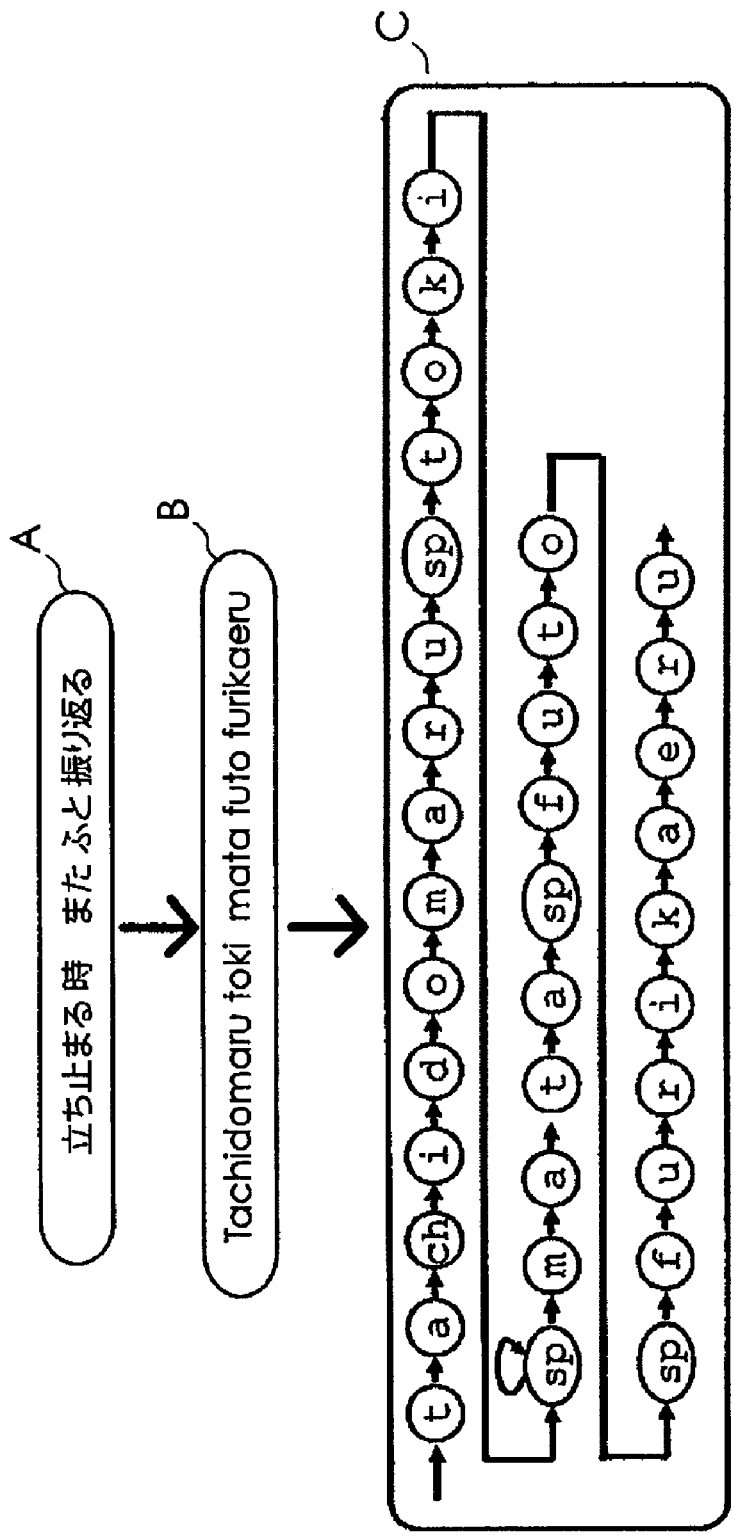
FIG. 10A shows an example of converting Japanese lyrics into a sequence of phonemes for alignment.

FIG. 10A shows an example of converting Japanese lyrics into a sequence of phonemes for alignment (phoneme network). First, text data A representing phrases of original lyrics are converted into a sequence of phonemes B. Then, the sequence is further converted into a sequence of phonemes for alignment C including vowels and consonants as well as short pauses (sp) by applying the "grammar" to the sequence of phonemes B.

In this example, the Japanese lyrics A are converted into the sequence of phonemes B of "tachidomaru toki mata futo furikaeru" and are further converted into the sequence of phonemes for alignment C including vowels and consonants as well as short pauses (sp) only. The sequence of phonemes for alignment C is a phoneme network SN.

Figure 10B:
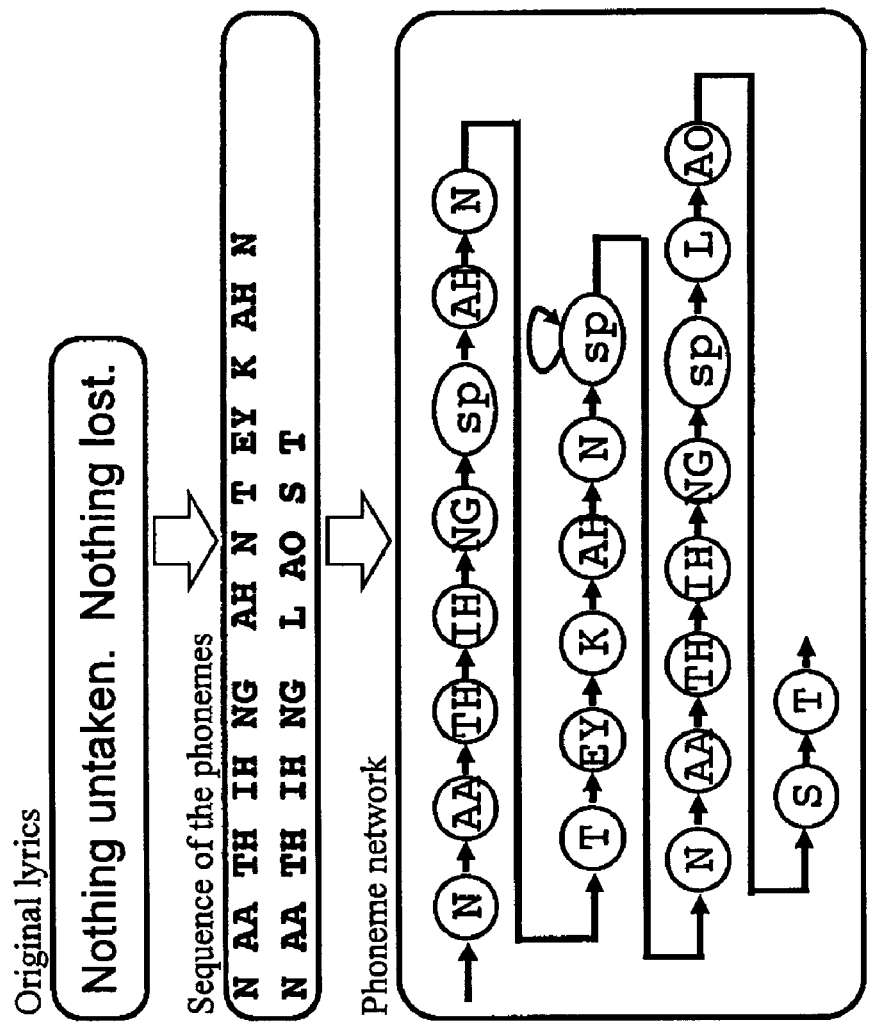
FIG. 10B shows an example of converting English lyrics into a sequence of phonemes for alignment.

FIG. 10B shows an example of converting English lyrics into a sequence of phonemes for alignment (phoneme network). In this example, the English lyrics are represented by English phonemes. Most preferably, an English phone model may be used for English lyrics using English phonemes. However, a Japanese phone model may be used for English lyrics if English phonemes are converted into Japanese phonemes. In an example of FIG. 10B, first, text data A representing phrases of original lyrics are converted into a sequence of phonemes B. Then, the sequence is further converted into a sequence of phonemes for alignment C only including phonemes used to identify the English phonemes (N, AA, TH . . . ) and short pauses (sp) by applying the two rules described above to the English lyrics converted into the sequence of phonemes B.

In this example, the English lyrics A of "Nothing untaken. Nothing lost" are converted into a sequence of English phonemes B of "N AA TH IH NG AH N T EY K AH N N AA TH IH NG L A O S T". Then, short pauses (sp) are combined with the sequence of phonemes B to form a sequence of phonemes for alignment C. The sequence of phonemes for alignment C is a phoneme network SN.

Returning to FIG. 1, to execute Step 3 of the fundamental approach of the present invention, the alignment means 17 is provided with a phone model 15 for singing voice that estimates phonemes corresponding to temporal-alignment features or features available for temporal alignment based on the temporal-alignment features. The alignment means 17 receives temporal-alignment features outputted from temporal-alignment feature extraction means 11, information on the vocal and non-vocal sections outputted from vocal section estimation means 9, and a phoneme network stored on the phoneme network storage means 13, and performs an alignment operation using the phone model 15 for singing voice on condition that no phoneme exists at least in non-vocal sections. Thus, temporal alignment between the music audio signal and lyrics is automatically made.

The alignment means 17 of this embodiment is configured to perform an alignment operation using Viterbi alignment. "Viterbi alignment" is known in the field of speech recognition, and is one of the techniques of searching an optimal solution designed to identify the most likely route between a music audio signal and grammar (a sequence of phonemes for alignment, namely a phoneme network) using the Viterbi algorithm. The Viterbi alignment is performed on condition that no phoneme exists in the non-vocal section, at least the non-vocal section is defined as a short pause, and likelihoods for other phonemes in the short pause (sp) are set to zero. In this manner, the likelihoods for other phonemes are set zero in the short pause sections, and accordingly the information on the vocal sections can be utilized, thereby attaining highly accurate alignment.

Figure 11:
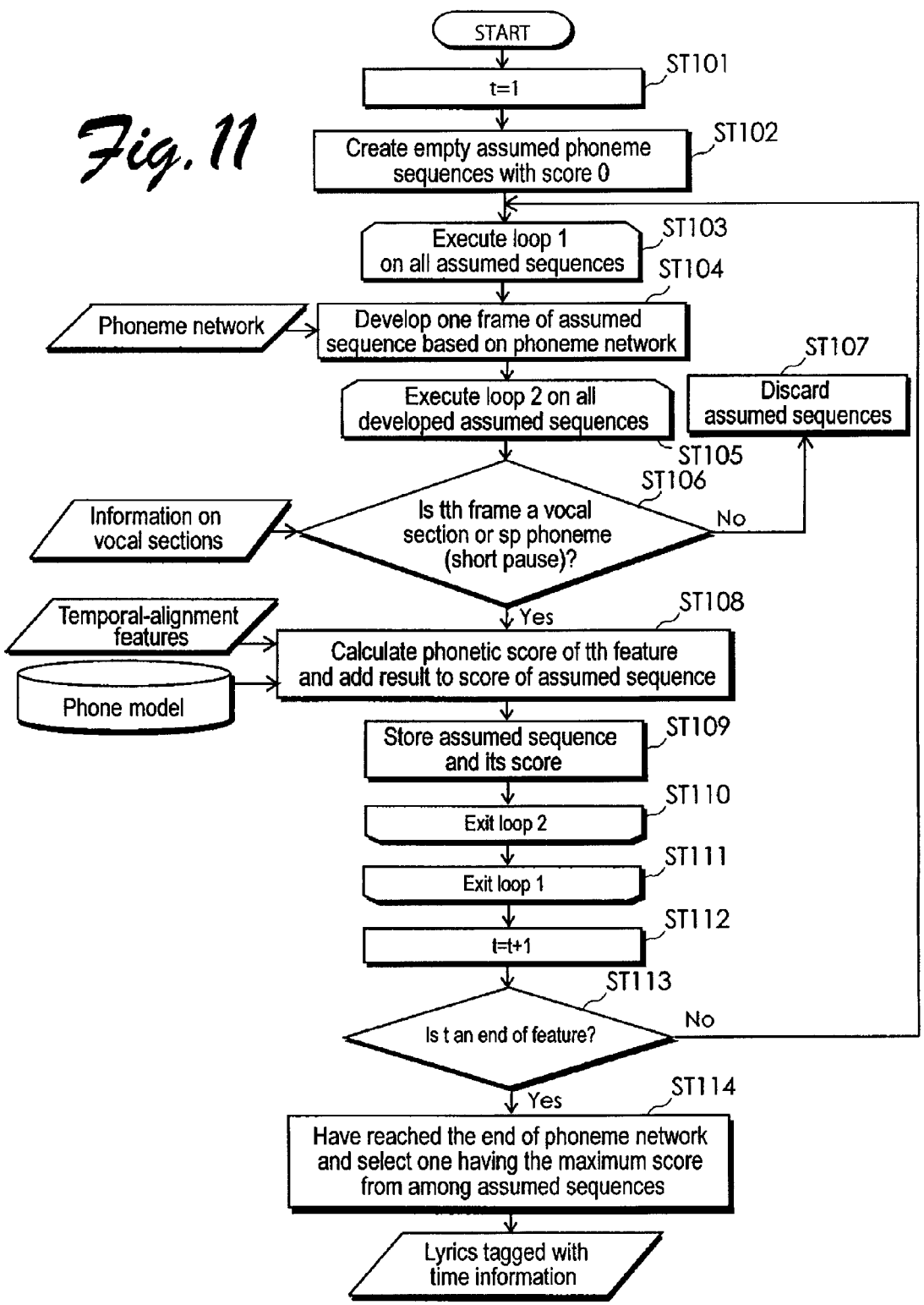
FIG. 11 is a flowchart showing an algorithm of the program which implements alignment means in the computer.

FIG. 11 is a flowchart showing an algorithm of the program which implements the alignment means 17 In the computer using the Viterbi alignment called as "frame synchronization Viterbi search." In the following description of the alignment operation, Japanese lyrics are used as an example. t=1 in step ST101 indicates an initial frame into which the first temporal-alignment feature is inputted. In the description of FIG. 11, this is simply called as "a feature." In step ST102, an empty assumed sequence is created using a score of zero (0). "An assumed sequence" refers to "a sequence of phonemes" up to the present time. An empty assumed sequence is a sequence in which no phoneme exists.

Instep ST103, loop 1 is performed on all of the assumed sequences of phonemes. Loop 1 is to calculate scores for each of the assumed sequences as of the time that the previous frame has been processed. For example, it is assumed that temporal alignment should be made in connection with a phoneme network of "a-i-sp-u-e . . . ". In this example, a possible assumed sequence of phonemes up to the sixth frame or the sixth phoneme may be "a a a a a a" or "a a a i i i" or "a a u u sp u" or others. In the process of the search, these possible assumed sequences are retained at the same time and calculation is performed on all of the assumed sequences. These assumed sequences have their own scores. Assuming that there are six frames, the score is obtained from calculations of possibilities or log likelihoods that features of each frame up to the sixth frame may be, for example, a sequence of phonemes of "a a a i i i" by comparing the features with a phone model. For example, when the sixth frame (t=6) has been processed and then processing of the seventh frame is started, calculations are done on all of the currently retained assumed sequences. The processing as described above is Loop 1.

In step ST104, "one frame of the assumed sequence is developed" based on the phoneme network. "One frame is developed" means extending the length of the assumed sequence by one frame. When one frame is developed, there is a possibility that another phoneme will follow the end of the current sequence and a plurality of assumed sequences will newly be created when one new frame for a next time is taken into consideration. The phoneme network is referenced or referred to in order to search a possible subsequent phoneme. For example, when the phoneme network is referenced in connection with the assumed sequence of "a a a i i i," two new assumed sequences may be created: "a a a i i i i" in which one "i" is assumed in the next frame, or "a a a i i i sp" in which a short pause sp is assumed in the next frame. In this example, when "one frame is developed" in one assumed sequence, two new assumed sequences are created with consideration given to the next frame in the time series. In step ST105, loop 2 is performed on all of the assumed sequences of phonemes. Loop 2 is to calculate scores for each of the newly created assumed sequences as a result of developing one frame. Score calculations are the same as those in loop 1. Since some assumed sequences are furthermore created respectively from the currently retained assumed sequences, loop 2 performs score calculations on all of the newly created assumed sequences.

In step ST106, it is determined whether the tth frame is a vocal section or a phoneme is a short pause (sp) based on the information on the vocal sections outputted from the vocal section estimation means 9. For example, the information on the vocal sections indicates that the 7th frame is a non-vocal section. Then, when the 7th frame of the assumed sequence is developed, a assumed sequence of "a a a i i i i" is not possible while a assumed sequence of "a a a i i i sp" is possible. Impossible assumed sequences will be discarded in step ST107. Since impossible assumed sequences are discarded through steps ST106 and ST107 with reference to the information on the vocal sections, alignment will be facilitated. In step ST106, if "Yes" is an answer, the process goes to step ST108.

In step ST108, a phonetic score is calculated for the tth feature using inputted features and the phone model. Then, the calculated score is added to the score of the assumed sequence. In other words, the tth feature is compared with the phone model, and a log likelihood (score) is calculated. The calculated score is added to the score of the assumed sequence. In short, score calculation evaluates or calculates how much the features are similar to the information on phonemes in the phone model by comparing the features with the phone model. Since the score is calculated by logarithm, the score will be −8 when it is determined that the features are not similar to the phone model at all. In step ST108, score calculations are performed on all of the assumed sequences. When the calculations are completed in step ST108, the process goes to step ST109 where the assumed sequences and their scores are retained. In step ST110, loop 2 corresponding to step ST105 is completed. In step ST111, loop 1 corresponding to step ST103 is completed. Then, in step ST112, the target time is incremented by one (1) to (t+1) and a next frame will be processed. In step ST113, it is determined whether or not the inputted frame is the end or terminal of the features. Until all of the features are inputted, steps ST103 through ST112 are repeated. Once all of the features have been processed, the process goes to step ST114. At this point, the end of the phoneme network has been reached when the features and phone model are compared. The assumed sequence of phonemes having the highest score is selected as a final selection from among the assumed sequences for which the end of the phoneme network has been reached. This final selection, or finally selected assumed sequence of phonemes has been defined based on the features corresponding to the time. In other words, the finally selected sequence of phonemes is a sequence of phonemes synchronized with the music audio signal. Therefore, lyric data to be displayed based on the finally selected sequence of phonemes will be "lyrics tagged with time information" or lyrics having time information required for synchronization with the music audio signal.

Figure 12A:
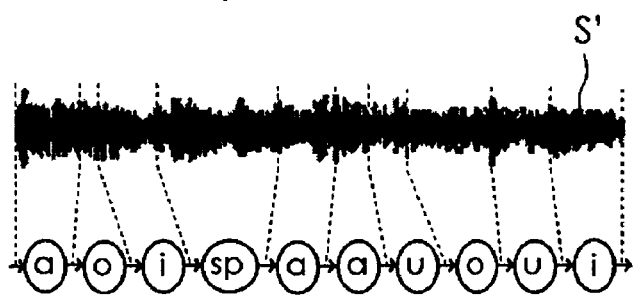
FIG. 12A shows that a phoneme network is temporally aligned by Viterbi alignment with the waveform of a dominant sound audio signal extracted from a music audio signal at a particular time.

FIG. 12A shows that a phoneme network or grammar is temporally aligned by Viterbi alignment with the waveform S' of a dominant sound audio signal extracted from a music audio signal at a particular time (the waveform of the audio signal with reduced accompaniment sounds). Once the alignment is completed, "lyrics tagged with time information" or lyrics having time information is finally obtained by restoring the sequence of phonemes (grammar) for alignment having time information to the form of lyrics. For simplicity, FIG. 12A shows vowels only.

Figure 12B:
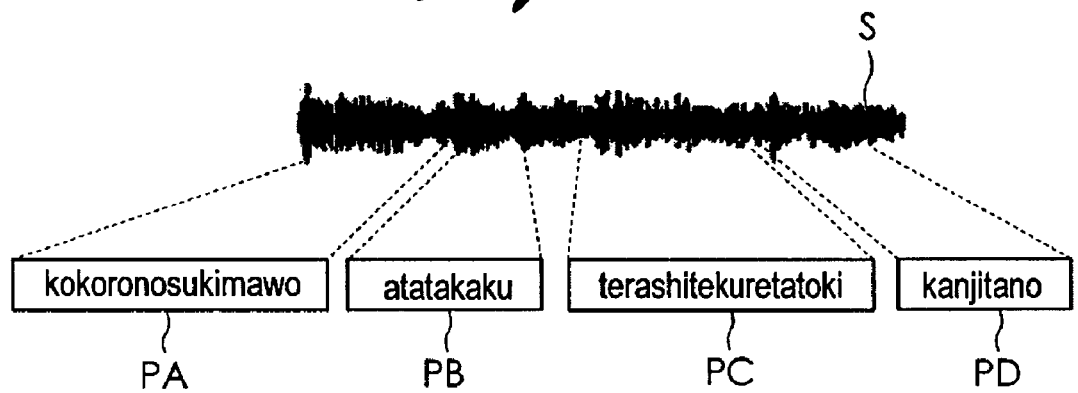
FIG. 12B shows that temporal alignment has been completed between lyrics and the music audio signal of mixed sounds including accompaniment sounds with the sequence of phonemes restored to the lyrics, following the Viterbi alignment.

FIG. 12B shows that temporal alignment has been completed between lyrics and the music audio signal S of mixed sounds including accompaniment sounds with the lyrics that have been restored from the sequence of phonemes (or grammar). PA through PD in the figure denote lyric phrases.

Next, the phone model 15 used in the alignment means 17 will be described below. Ideally, the phone model 15 for singing voice is a phone model that has been trained or taught based on a large amount of lyric datasets for alignment of vocal utterance (lyrics). At the present, however, such database has not been built up. In this embodiment, a phone model is obtained by re-estimating (training) parameters of a phone model for speaking voice or speech so as to recognize vocal phonemes of the music including vocals and accompaniment sounds.

The phone model for singing voice is constructed based on the phone model for speaking voice in the following three steps. The adaptation technique consists of the following three, and "construction of a phone model for speaking voice" is a preliminary step. "A phone model for speaking voice" is publicly known and the description will be omitted.

(1) To adapt the phone model for speaking voice to vocals without accompaniments.

(2) To adapt the phone model for vocals without accompaniments to segregated vocals extracted by accompaniment sound reduction method.

(3) To adapt the phone model for segregated vocals to a particular musical piece or a particular singer in the input music.

The steps of (1) through (3) are all carried out for "training" as shown in FIG. 2, prior to the runtime.

As shown in FIG. 2, the phone model 101 for speaking voice is adapted to vocals 103 without accompaniments and phoneme labels 102 (trainer information), thereby creating a phone model 104 for vocals without accompaniments in adaptation step (1). The phone model 104 for vocals without accompaniments is adapted to phoneme labels 102 (trainer information) and vocal data 105 including dominant sound audio signals extracted by accompaniment sound reduction method, thereby creating a phone model 106 for segregated vocals, in adaptation step (2). The phone model 106 for segregated vocals is adapted to particular phoneme labels (phoneme network) and features in the input music, thereby creating a phone model 107 for a particular singer, in adaptation step (3). In the example of FIG. 2, the phone model 107 for a particular singer is used as the phone model 15 for singing voice of FIG. 1.

All of the steps of (1) through (3) are not necessarily carried out. For example, only step (1) may be carried out (this is called as "one-step adaptation"), or steps (1) and (2) may be carried out (this is called as "two-step adaptation"), or all of steps (1) through (3) may be carried out (this is called as "three-step adaptation"). Adaptation of the phone model may arbitrarily be carried out by combining one or more of the steps mentioned above.

The trainer information refers to time information for each phoneme (the start time and end time of the phoneme). When the phone model for speaking voice is adapted using the trainer information such as vocal data 103 without accompaniments and phoneme labels 102, phoneme data are used for which exact segmentation has been done based on the time information.

Figure 13:
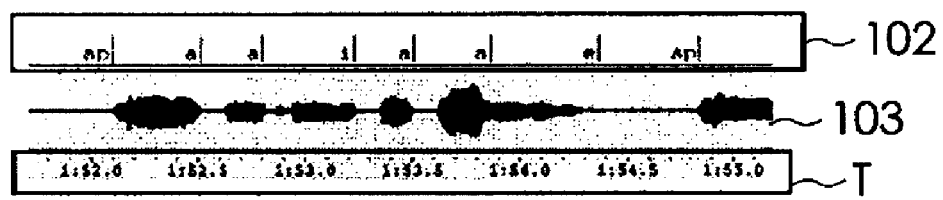
FIG. 13 shows an example of phoneme labels for adaptation, which are accompanied by time information.

FIG. 13 shows an example of phoneme labels 102 for adaptation, in respect of Japanese lyrics tagged time information. The phoneme labels 102 of FIG. 13 have been annotated manually. The maximum likelihood linear regression (MLLR) and the maximum a posteriori probability (MAP) may be combined for use in parameter estimation in the adaptation steps. When MLLR and MAP are combined for use, the result obtained from MLLR adaptation is used as a prior probability distribution like an initial value in MAP estimation.

Figure 14:
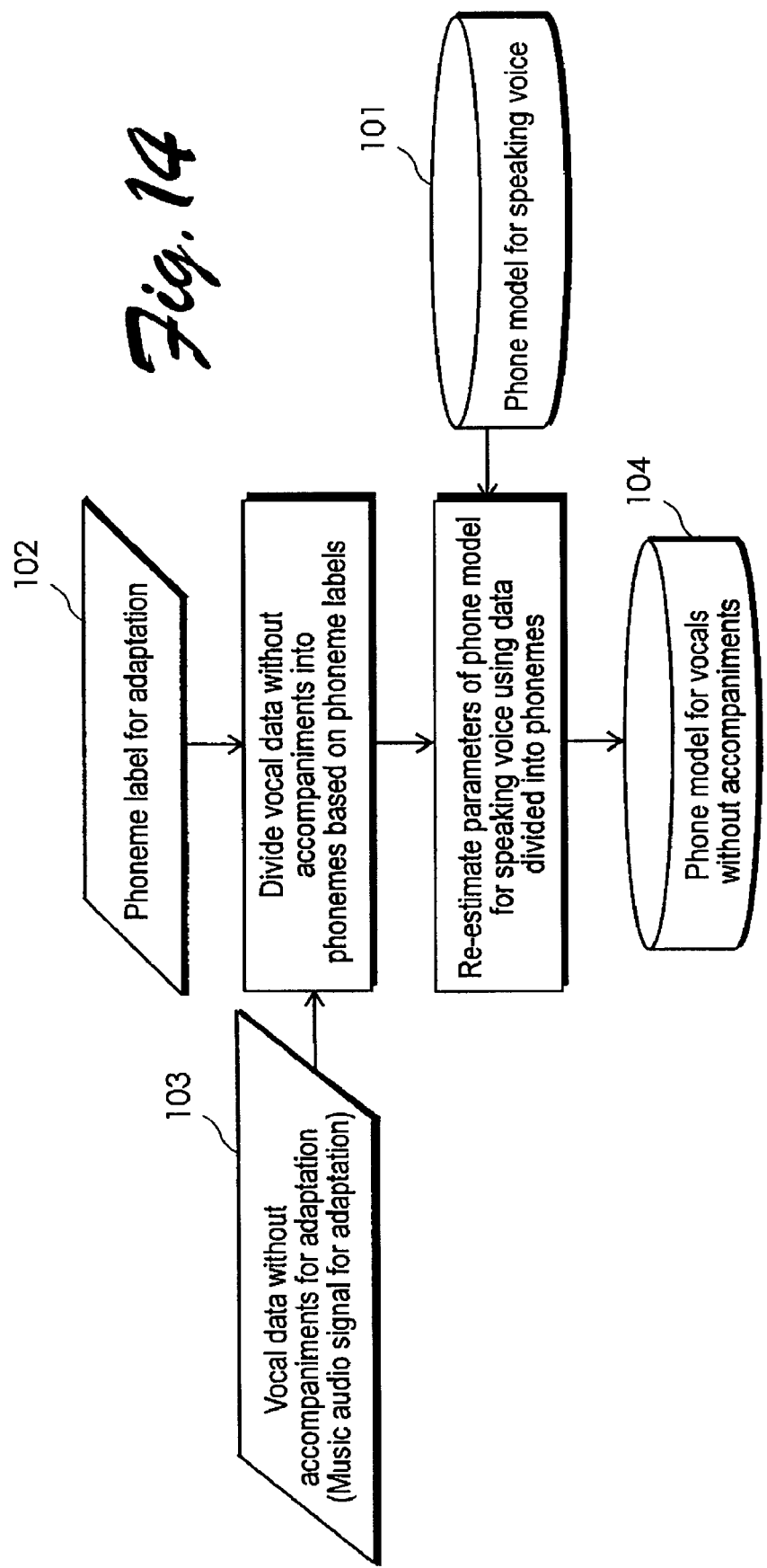
FIG. 14 is a flowchart showing the steps of creating a phone model.

The adaptation technique of the phone model will be furthermore described below. FIG. 14 is a flowchart showing details of one-step adaptation. In the one-step adaptation, vocal data without accompaniments or music audio signal 103 for adaptation is divided into phonemes, based on the phoneme labels 102 for adaptation corresponding to the music audio signal 103. Then, using divided data for each phoneme, parameters of the phone model 101 for speaking voice are re-estimated so as to recognize vocal phonemes in the music audio signal 103 for adaptation, thereby the phone model 104 for vocals without accompaniments that is used as the phone model 15 for singing voice. The phone model 104 of this type is suitable for vocals without accompaniments or vocals with accompaniments smaller than the vocals.

Figure 15:
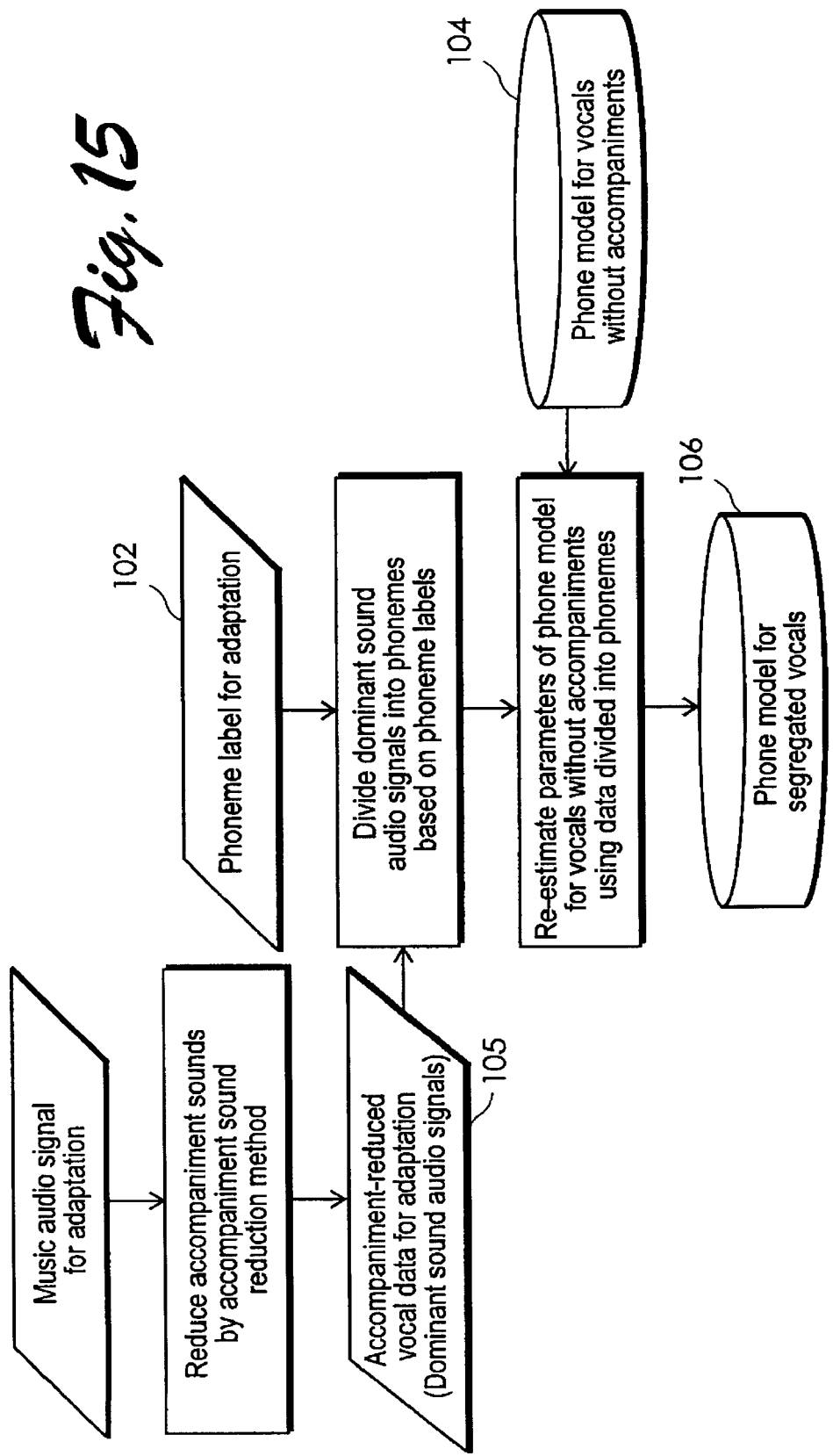
FIG. 15 is a flowchart showing the steps of creating a phone model.

FIG. 15 is a flowchart showing details of two-step adaptation. In the two-step adaptation, dominant sound audio signals 105 of the most dominant sounds including vocals, extracted from the music audio signal for adaptation including vocals and accompaniment sounds are divided into phonemes, based on the phoneme labels 102 for adaptation. Then, using divided data for each phoneme, parameters of the phone model 104 for vocals without accompaniments are re-estimated so as to recognize vocal phonemes in the dominant sound music audio signals 105, thereby the phone model 106 for segregated vocals that is used as the phone model 15 for singing voice. The phone model 106 of this type is suitable for vocals with as large accompaniments as the vocals.

Figure 16:
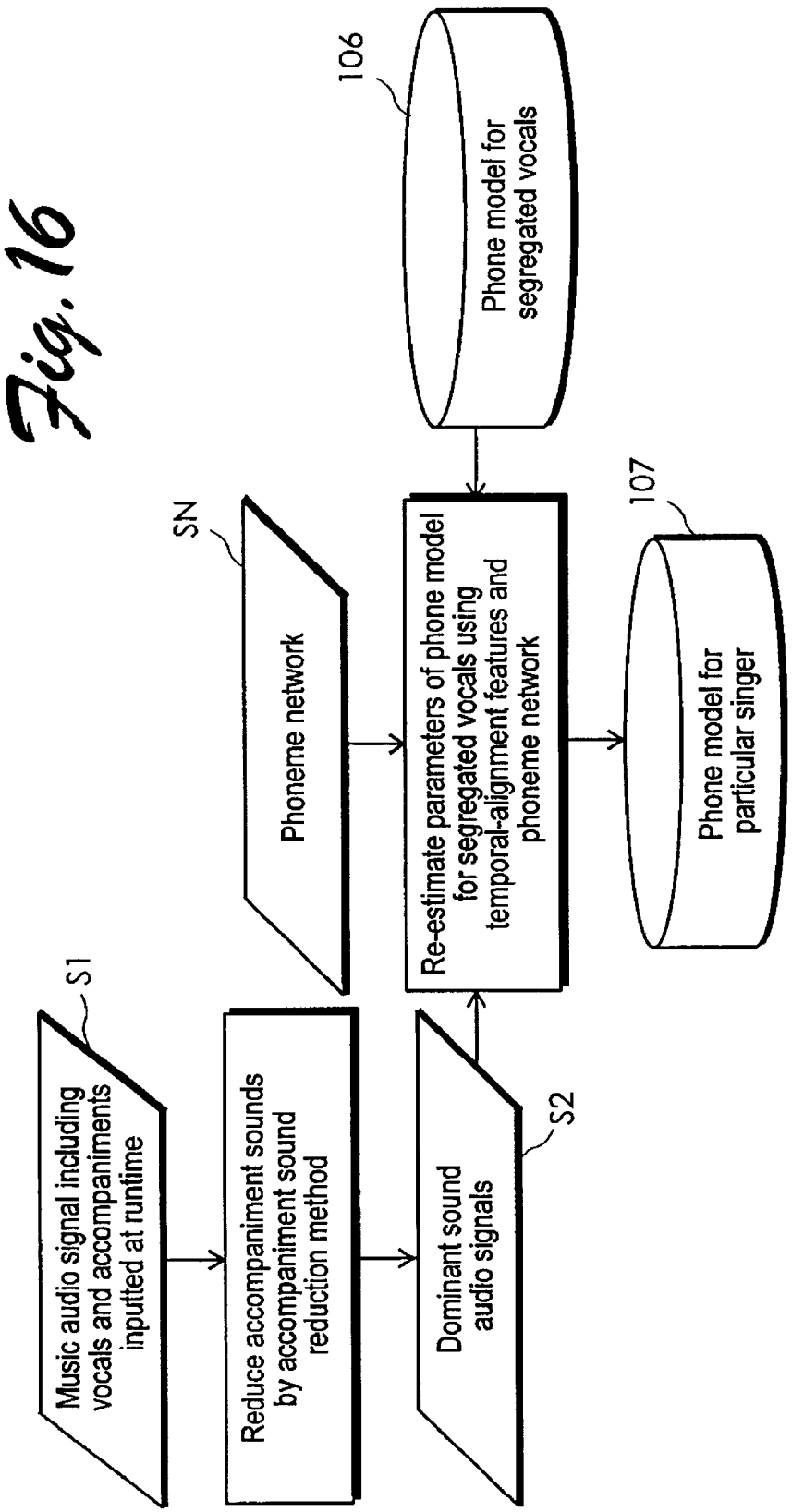
FIG. 16 is a flowchart showing the steps of creating a phone model.

Further, FIG. 16 is a flowchart showing details of three-step adaptation. In the three-step adaptation, the dominant sound audio signals S2 are used. The dominant sound audio signals S2 have been obtained by reducing accompaniment sounds by accompaniment sound reduction method from the music audio signal S1 including vocals and accompaniment sounds inputted at the runtime of the system. Parameters of the phone model 106 for segregated vocals are estimated so as to recognize vocal phonemes of a particular singer singing the music of the music audio signal, using the temporal-alignment features extracted by the temporal-alignment feature extraction means 11 from the dominant sound audio signals S2 including vocals extracted from the music audio signal inputted into the system, and the phoneme network SN corresponding to the inputted music audio signal, thereby creating the phone model 107 for a particular singer. The phone model 107 of this type may increase alignment accuracy since it is directed to a particular singer.

In a music audio signal reproducing apparatus which reproduces a music audio signal while displaying on a screen lyrics temporally aligned with the music audio signal to be reproduced, if the system of the present invention is used to display lyrics temporally aligned with the music audio signal, lyrics which is synchronized with music to be played back can be displayed on the screen.

Next, with reference to FIGS. 1 and 2, a method of automatically making temporal alignment between a music audio signal and lyrics according to the present invention will be described below. First, the dominant sound audio signal extraction means 5 extracts, from a music audio signal S1 of music including vocals and accompaniment sounds, a dominant sound audio signal S2 of the most dominant sound including the vocal at each time (in the dominant sound audio signal extraction step). Next, the vocal-section feature extraction means 7 extracts a vocal-section feature available to estimate a vocal section which includes the vocal and a non-vocal section which does not include the vocal, from the dominant sound audio signal S2 at each time (in the vocal-section feature extraction step). Then, the vocal section estimation means 9 estimates the vocal section and the non-vocal section, based on a plurality of the vocal-section features and outputs information on the vocal section and the non-vocal section (in the vocal section estimation step). Next, the temporal-alignment feature extraction means 11 extracts a temporal-alignment feature suitable to make temporal alignment between lyrics of the vocal and the music audio signal from the dominant sound audio signal S2 at each time (in the temporal-alignment feature extraction step). Further, a phoneme network SN is stored in phoneme network storage means 13 (in the storage step). The phoneme network SN is constituted from a plurality of phonemes corresponding to the music audio signal S1 and temporal intervals between two adjacent phonemes are connected in such a manner that the temporal intervals can be adjusted. Then, alignment means 17 is provided with the phone model 15 for singing voice that estimates a phoneme corresponding to the temporal-alignment feature, based on the temporal-alignment feature, and performs an alignment operation that makes the temporal alignment between the plurality of phonemes in the phoneme network SN and the dominant sound audio signals S2 (in the alignment step). In the alignment step, the alignment means 17 receives the temporal-alignment feature obtained in the step of extracting the temporal-alignment feature, the information on the vocal section and the non-vocal section, and the phoneme network SN, and performs the alignment operation using the phone model 15 for singing voice on condition that no phoneme exists at least in the non-vocal section.

Generally, vocal detection is evaluated in view of a hit rate and a correct rejection rate. The hit rate refers to a rate at which a section actually including the vocal can properly be detected as a vocal section. The correct rejection rate refers to a rate at which a section actually including no vocals can properly be discarded as a non-vocal section. The vocal section estimation means 9 of this embodiment is configured to control a balance between the hit rate and the correct rejection rate. Why this configuration is required is: there is a trade-off relationship between the hit rate and the correct rejection rate and a proper balance between these rates depends upon the application. Generally, it is preferred to detect every section that possibly may include the vocal by maintaining a relatively high hit rate since the vocal section estimation works as pre-processing for the Viterbi alignment. When identifying singers, it is desirable to detect only the sections which definitely include the vocals by maintaining a high correct rejection rate. None of the existing techniques can control a balance between the hit rate and correct rejection rate.

Next, the evaluation results for the embodiment of the present invention will be described below.

The method of the present invention was applied to commercially available digital music data and lyric data and experiments were carried out to confirm that lyrics were displayed in synchronization with reproduction of the music. Accordingly, it has been confirmed that lyrics were temporally aligned with real-world music audio signals including various accompaniment sounds in a robust manner. The experiments were carried out as follows:
(Experimental Conditions)

Ten (10) songs respectively sung by ten (10) singers (five male singers and five female singers) were randomly selected from the popular music database (RWC-MDB-P-2001) registered in the RWC Music Database which is one of the public research databases.

Most of the songs are sung in Japanese. Some songs are partially sung in English. In the experiments, the English phonemes were approximated using a phone model for the Japanese phonemes. Five fold cross validation was conducted for each gender, male and female, using these ten songs. When evaluating a particular song sung by a particular singer, the phone model was adapted using other songs sung by other singers of the same gender as that particular singer.

19 songs sung by 11 singers were randomly selected as training or teaching datasets for vocal section detection. These songs were also extracted from the popular music database (RWC-MDB-P-2001).

The 11 singers were intended for training or teaching, and they were not included in the 10 singers intended for evaluation of the system according to the present invention. The accompaniment sound reduction method was also applied to the training datasets for vocal section detection. The task-dependent value $\eta_{fixed}$ was set to 15.

FIG. 9 tabulates analysis conditions for Viterbi alignment. A gender-dependent monophonic model provided of the CSRC software was used as an initial phone model. The readings created by Japanese Morphological Analysis System called "Chasen" was used to convert lyrics into a sequence of phonemes. The Hidden Markov Toolkit (HTK) was used for adaptation of the phone model.

The evaluation was based on the phrase-level alignment. In the experiments, a phrase refers to one portion or section delimited by a space or a line feed in the original lyrics.

FIG. 17 is an illustration used to explain evaluation criteria. As shown in FIG. 17, a "correct section" refers to a time zone in which the correct label overlaps with the output result. Other sections are regarded as "incorrect sections." A proportion of the total length of the correct sections to the whole length of a song (the sum of the correct and incorrect sections in length) is defined as the "accuracy" which corresponds to [Total length of "correct" sections divided by Whole length of the song]. In FIG. 17, phrase A, phrase B, and phrase C are respectively a phrase included in the lyrics. In an example of FIG. 10, "Nothing untaken" and "Nothing lost" are respectively a phrase in the lyrics.

A proportion of the total length of the correct sections that are correctly labeled in phrase level to the whole length of the music was calculated as an evaluation criterion of the entire system. When the accuracy was over 90%, it was considered that alignment was properly or correctly done for the music.
(Evaluation of the Entire System)

The experiments were conducted by the method of the present invention in order to evaluate the performance of the technique proposed in the present invention.

Figures 18A, 18B:
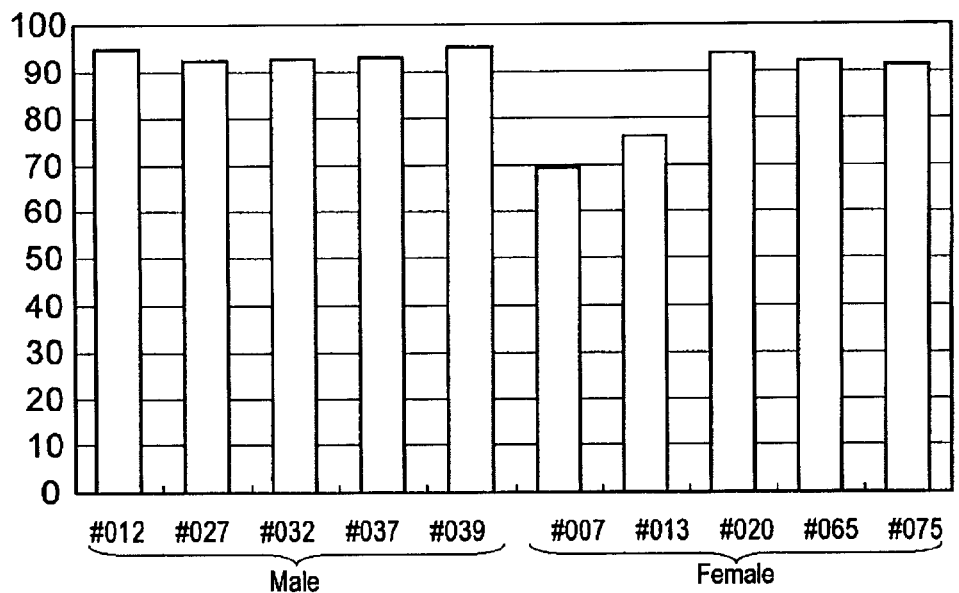
FIGS. 18A and 18B respectively show experimental results to confirm the effect of the present invention.

FIGS. 18A and 18B respectively show experimental results to confirm the effect of the present invention. As shown in FIG. 18A, the accuracy of more than 90% was attained for the alignment, namely, the accuracy was over 90% for eight songs out of ten songs except two songs #007 and #013. FIG. 18B tabulates the results by song, the average error in detecting the start time of a phrase in each song.

These results indicate that the method of the present invention may estimate temporal relationships with satisfactory accuracy for eight songs out of ten songs. Form the table, it can be known that the accuracy for male singers is higher than that for female singers. This is because female singing voices generally have higher fundamental frequencies F0 than male singing voices, and accordingly it is difficult to extract spectral features like MFCC for the female singing voices. Typical errors occurred in a hamming section with no lyrics included therein.
(Effectiveness of Phone Model Adaptation)

Alignment experiments were conducted in the following four conditions for the purpose of confirming the effectiveness of phone model adaptation.

(i) No adaptation: the phone model was not adapted.

(ii) One-step adaptation: the phone model for speaking voice was directly adapted to segregated vocals, but was not adapted to a particular singer without trainer information.

(iii) Two-step adaptation: the phone model for speaking voice was adapted to vocals without accompaniments, and then to segregated vocals. The phone model was not adapted to a particular singer without trainer information.

(iv) Three-step adaptation (proposed in the present invention): the phone model for speaking voice was adapted to vocals without accompaniments, and then to segregated vocals. Finally, the phone model was adapted to an input audio signal of a particular singer without trainer information. In the experiments, the accompaniment sound reduction (Step 1) and vocal section detection (Step 2) were applied on all of the conditions (i) through (iv).

Figures 19A, 19B:
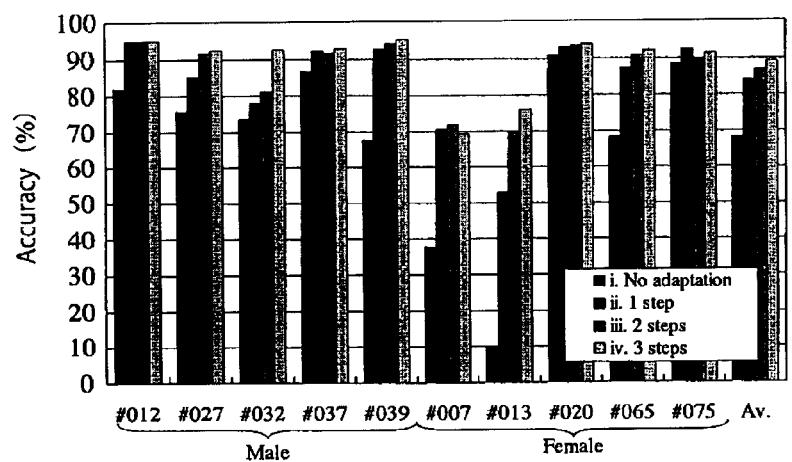
FIGS. 19A and 19B respectively show experimental results in conditions (i) to (iv).

FIGS. 19A and 19B respectively show experimental results in conditions (i) to (iv). FIG. 19A shows accuracy percentages of alignment in respect of individual musical pieces in respective conditions. FIG. 19B tabulates the accuracy percentages in respective conditions.

These results all indicate that the technique proposed in the present invention was effective in all musical pieces used in the experiments. Especially, the highest accuracy was attained in condition (iv). This suggests that condition (iv) is the best mode for carrying out the present invention.

(Evaluation of Vocal Section Detection)

Next, the hit rate and the correct rejection rate were investigated in respect of the individual musical pieces for the purpose of confirming the effectiveness of vocal section detection (Step 2) described before.

Simultaneously, the performance of vocal section detection was also evaluated. The experiments were conducted in two conditions: enabling and disabling vocal. In the experiments, three-step adaptation (adaptation step 1 through adaptation step 3) was performed in all cases.

Figure 20A:
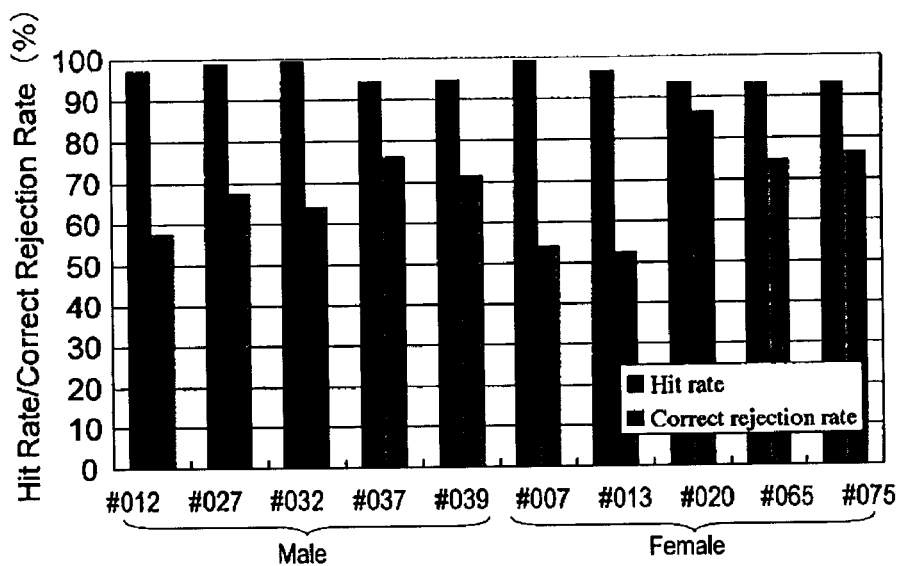
FIG. 20A shows a hit rate and a correct rejection rate in vocal section detection in respect of individual musical pieces.
Figure 20B:
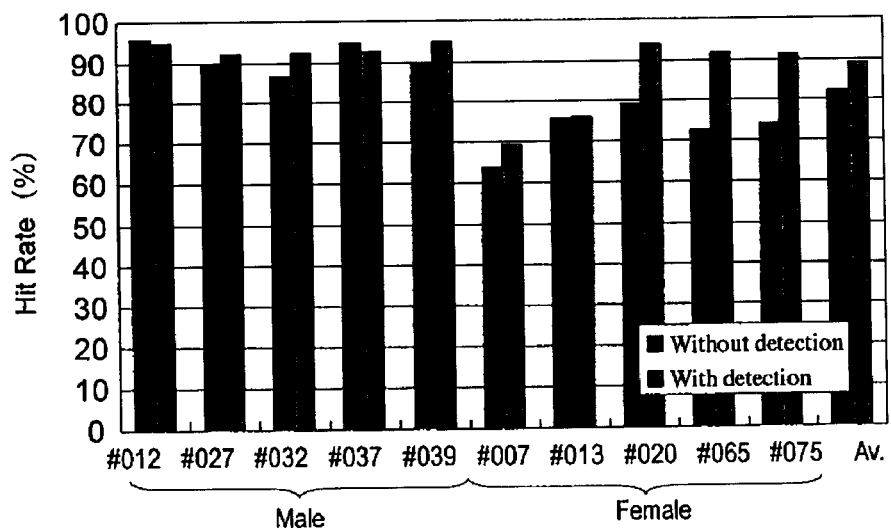
FIG. 20B compares the accuracy of alignment in music with a vocal section detected with the accuracy of alignment in music with no vocal section detected.

FIG. 20A shows a hit rate and a correct rejection rate in vocal section detection in respect of individual musical pieces. FIG. 20B compares the accuracy of alignment with vocal section detection enabled with the accuracy of alignment with vocal section detection disabled It follows from the experiment results that the accuracy of alignment has increased on an average when the vocal section detection is enabled. It can be known from FIG. 20B that the accuracy of alignment has especially increased when the vocal section detection was applied to musical pieces having relatively low accuracy. However, the effect of vocal section detection was not observed in songs, #007 and #013 although these musical pieces had originally low accuracy. This may be because non-vocal sections could not be removed sufficiently since the correct rejection rate of vocal sections was not high, as shown in FIG. 20A.

When the vocal section detection was applied to songs, #012 and #037 for which the high accuracy of alignment was observed, the hit rate of vocal section detection slightly decreased. This may be because a vocal section which is improperly removed or discarded in the vocal section detection is always judged incorrect in the alignment process.

As described above, the inventors of the present invention have conducted experiments using musical pieces written in Japanese or having Japanese lyrics to confirm the performance of the system and method of the present invention. In respect of musical pieces written in English or having English lyrics, it has confirmed that temporal alignment was made with relatively high accuracy by converting English phonemes into Japanese phonemes of similar pronunciation to corresponding English phonemes, and creating a phoneme network including the resulting Japanese phonemes. If a phone model suitable for target language and datasets for adaptation to the phone model can be prepared, it will be possible to make temporal alignment with higher accuracy in respect of musical pieces written in foreign languages such as English.

Further, it will be possible to make temporal alignment between music and lyrics with higher accuracy by utilizing higher-level information on musical structures such as tempo and local repetitions included in the music.

At the present, techniques for temporal alignment between music audio signals and lyrics according to the present invention are constituted from independent programs of which the major procedural steps are distributed in a form of toolkits. Through application-oriented programming, the techniques proposed in the present invention can be provided in a single computer program. Some specific example applications of the present invention will be described below.

APPLICATION EXAMPLE 1

Display of Lyrics Synchronized with Music Playback

The present invention is applied in displaying lyrics in synchronization with music. The inventors of the present invention have developed software for music digital data reproduction that changes the display colors of lyrics synchronized with music playback, based on the lyrics tagged with time information and have succeeded in changing the display colors of lyrics in synchronization with the music playback. It has been confirmed the accuracy of alignment as described above.

Lyrics were displayed on a screen and the display colors of the lyrics were changing in accompaniment with vocals. At a glance, this looked like so-called Karaoke equipment. However, phrase tracking was extremely accurate and musical appreciation was furthermore improved. The synchronization was automatically done by the computer program, not manually. This is quite different from the existing techniques.

APPLICATION EXAMPLE 2

Music Cueing Based on Lyrics

According to the present invention, time information can be obtained in connection with lyrics. It is possible to program the music to be played back from a point corresponding to a clicked portion of the lyrics displayed on the screen. In other words, the lyrics are displayed on the screen; a portion of the lyrics is clicked; then, the music is played back from that point corresponding to the clicked portion of the lyrics.

The inventors have added this functionality to the software for music digital data reproduction, and have succeeded in starting the performance of the music from a point corresponding to the clicked portion of the lyrics. This functionality has not ever been implemented by existing techniques. It provides users with a new way of appreciating the music by actively selecting user's favorite portions of the music.

In the application examples mentioned above, the software for music digital data reproduction that the inventors have developed is used. Of course, any other software for music digital data reproduction may be used.

It is expected that the present invention will be applied in the industrial fields such as supporting techniques for music appreciation and music search. Especially in recent years, as digital music data delivery services are widely spreading, importance of such techniques is increasing.

The foregoing descriptions are intended to describe an embodiment of the present invention. Adaptations and modifications of the above-mentioned embodiment can be configured without departing from the scope and spirit of the invention.

The invention claimed is:

1. A system to be implemented in a computer having installed a program for temporal alignment of musical audio signal with lyrics, comprising:

dominant sound audio signal extraction means for extracting, from a music audio signal of music including vocals and accompaniment sounds, a dominant sound audio signal of the most dominant sound including the vocal at least one predetermined time, vocal-section feature extraction means for extracting a vocal-section feature available to estimate a vocal section which includes the vocal and a non-vocal section which does not include the vocal, from the dominant sound audio signal at least one predetermined time, vocal section estimation means for estimating the vocal section and the non-vocal section, based on a plurality of the vocal-section features and outputting information on the vocal section and the non-vocal section, temporal-alignment feature extraction means for extracting a temporal-alignment feature suitable to make temporal alignment between lyrics of the vocal and the music audio signal, from the dominant sound audio signal at least one predetermined time, phoneme network storage means for storing a phoneme network constituted from a plurality of phonemes and short pauses in respect of lyrics in music corresponding to the music audio signal, and alignment means for performing an alignment operation that makes temporal alignment between the plurality of phonemes in the phoneme network and the dominant sound audio signals, the alignment means being provided with a phone model for singing voice that estimates a phoneme corresponding to the temporal-alignment feature, based on the temporal-alignment feature, wherein the alignment means receives the temporal-alignment feature outputted from the temporal-alignment feature extraction means, the information on the vocal section and the non-vocal section, and the phoneme network, and performs the alignment operation on condition that no phoneme exists at least in the non-vocal section.

2. The system according to claim 1, wherein the vocal section estimation means includes Gaussian model storage means for storing a plurality of Gaussian mixture models for vocals and non-vocals obtained in advance by training based on a plurality of training musical datasets, and the vocal section estimation means estimates the vocal section and the non-vocal section, based on the plurality of vocal-section features and the plurality of Gaussian mixture models.

3. The system according to claim 2, wherein the vocal section estimation means includes:

log likelihood calculation means for calculating a vocal log likelihood and a non-vocal log likelihood at the predetermined time, based on the vocal-section feature and the Gaussian mixture model at the predetermined time, log likelihood difference calculation means for calculating a log likelihood difference between the vocal log likelihood and the non-vocal log likelihood at the predetermined time, histogram creation means for creating a histogram relating to a plurality of log likelihood differences obtained over the whole period of the music audio signal, bias correction value determination means for defining a threshold to maximize between-class variance, and determining the threshold as a music-dependent bias correction value when the histogram is divided into two music-dependent classes, the music-dependent log likelihood differences in the vocal sections and those in the non-vocal sections, estimation parameter determination means for determining an estimation parameter used in estimating a vocal section by adding a task-dependent value to the bias correction value in order to correct the bias correction value, weighting means for weighting the vocal log likelihood and the non-vocal log likelihood at the predetermined time using the estimation parameter, and most likely route calculation means for defining the weighted vocal log likelihoods and the weighted non-vocal log likelihoods which are obtained over the whole period of the music audio signal as an output probability of a vocal state ($S_v$) and an output probability of a non-vocal state ($S_N$) in a Hidden Markov Model, respectively, calculating the most likely routes for the vocal state and the non-vocal state over the whole period of the music audio signal, and determining, based on the most likely routes, information on the vocal and non-vocal sections over the whole period of the music audio signal.

4. The system according to claim 3, wherein the weighting means approximates an output probability of log $p(x|S_v)$ for the vocal state ($S_v$) and an output probability of log $P(x|S_N)$ for the non-vocal state ($S_N$) with the following equations:

$$\log p(x|s_V) = \log N_{GMM}(x; \theta_V) - \tfrac{1}{2}\eta$$

$$\log p(x|s_N) = \log N_{GMM}(x; \theta_N) + \tfrac{1}{2}\eta$$

where $N_{GMM}(x; \theta_V)$ stands for the probability density function of Gaussian mixture model (GMM) for vocals, $N_{GMM}(x; \theta_N)$ for the probability density function of Gaussian mixture model (GMM) for non-vocals, $\theta_V$ and $\theta_N$ are parameters determined in advance by training based on the plurality of training musical datasets, and $\eta$ is the estimation parameter, and the most likely route calculation means calculates the most likely route with the following equation:

$$\hat{S} = \mathrm{argmax}/S\Sigma t \ \{\log p\ (x|s_t) + \log p(s_{t+1}|s_t)\}$$

where $p(x|s_t)$ stands for an output probability for a state $S_t$ and $p(s_{t+1}|s_t)$ for a transition probability from a state $S_t$ to a state $S_{t+1}$.

5. The system according to claim 1, wherein the alignment means performs an alignment operation using Viterbi alignment, and the alignment operation is performed on condition that no phoneme exists in the non-vocal section when Viterbi alignment is performed, at least the non-vocal section is defined as a short pause, and likelihoods for other phonemes in the short pause are set to zero.

6. The system according to claim 1, wherein the phone model for singing voice is a phone model that is obtained by re-estimating parameters of a phone model for speaking voice so as to recognize phonemes of the vocals in the music including vocals and accompaniment sounds.

7. The system according to claim 6, wherein the phone model for singing voice is a phone model for vocals without accompaniments that is obtained by re-estimating parameters of the phone model for speaking voice, using a music audio signal for adaptation to vocals without accompaniments and phoneme labels for adaptation corresponding to the music audio signal for adaptation, so as to recognize phonemes of the vocals from the music audio signal for adaptation.

8. The system according to claim 6, wherein
the phone model is a phone model for segregated vocals that is obtained by preparing a phone model for vocals without accompaniments obtained by re-estimating parameters of the phone model for speaking voice, using a music audio signal for adaptation to vocals without accompaniments and phoneme labels for adaptation corresponding to the music audio signal for adaptation, so as to recognize phonemes of the vocals from the music audio signal for adaptation, and
by re-estimating parameters of the phone model for vocals without accompaniments, using dominant sound music audio signals of the most dominant sounds including the vocals extracted from the music audio signal for adaptation including vocals as well as accompaniment sounds, and phoneme labels for adaptation corresponding to the dominant sound music audio signals, so as to recognize phonemes of the vocals from the dominant sound music audio signals.

9. The system according to claim 6, wherein
the phone model is a phone model for a particular singer that is obtained by preparing a phone model for vocals without accompaniments obtained by re-estimating parameters of the phone model for speaking voice, using a music audio signal for adaptation to vocals without accompaniments and phoneme labels for adaptation corresponding to the music audio signal for adaptation, so as to recognize phonemes of the vocals from the music audio signal for adaptation,
by re-estimating parameters of the phone model for vocals without accompaniments, using dominant sound music audio signals of the most dominant sounds including the vocals extracted from the music audio signal for adaptation including vocals as well as accompaniment sounds, and phoneme labels for adaptation corresponding to the dominant sound music audio signals, so as to recognize phonemes of the vocals from the dominant sound music audio signals, and
by estimating parameters of the phone model for segregated vocals, using the temporal-alignment features stored in the temporal-alignment feature extraction means and the phoneme network stored in the phoneme network storage means, so as to recognize phonemes of the vocals of a particular singer singing the music of the music audio signal inputted into the music audio signal extraction means.

10. A music audio signal reproducing apparatus which reproduces a music audio signal while displaying on a screen lyrics temporally aligned with the music audio signal to be reproduced, using the system of claim 1 to display on the screen the lyrics temporally aligned with the music audio signal.

11. A method of automatically making temporal alignment between music audio signal and lyrics, comprising the steps of:
extracting a dominant sound audio signal of the most dominant sound from a music audio signal of music at least one predetermined time with dominant sound audio signal extraction means, wherein the most dominant sound includes a vocal from the music, the music including vocals and accompaniment sounds,
extracting a vocal-section feature available to estimate a vocal section and a non-vocal section from the dominant sound audio signal at least one predetermined time with vocal-section feature extraction means, wherein the vocal section includes the vocal and the non-vocal section does not include the vocal,
estimating the vocal section and the non-vocal section and outputting information on the vocal section and the non-vocal section with vocal section estimation means, wherein the vocal and non-vocal sections are estimated based on a plurality of the vocal-section features,
extracting a temporal-alignment feature suitable to make temporal alignment between lyrics of the vocal and the music audio signal, from the dominant sound audio signal at least one predetermined time, with temporal-alignment feature extraction means,
storing a phoneme network with phoneme network storage means, the phoneme network being constituted from a plurality of phonemes and short pauses in respect of lyrics in music corresponding to the music audio signal, and
performing an alignment operation, which makes the temporal alignment between the plurality of phonemes in the phoneme network and the dominant sound audio signals, with alignment means, wherein the alignment means is provided with a phone model for singing voice that estimates a phoneme corresponding to the temporal-alignment feature, based on the temporal-alignment feature, and the alignment means receives the temporal-alignment feature obtained in the step of extracting the temporal-alignment feature, the information on the vocal section and the non-vocal section, and the phoneme network, and then performs the alignment operation on condition that no phoneme exists at least in the non-vocal section.

12. A computer program for temporal alignment between music audio signal and lyrics recorded on a non-transitory computer-readable recording medium, causing a computer to implement:
dominant sound audio signal extraction means for extracting, from a music audio signal of music including vocals and accompaniment sounds, a dominant sound audio signal of the most dominant sound including the vocal at least one predetermined time,
vocal-section feature extraction means for extracting a vocal-section feature available to estimate a vocal section which includes the vocal and a non-vocal section which does not include the vocal, from the dominant sound audio signal at least one predetermined time,
vocal section estimation means for estimating the vocal section and the non-vocal section, based on a plurality of the vocal-section features and outputting information on the vocal section and the non-vocal section,
temporal-alignment feature extraction means for extracting a temporal-alignment feature suitable to make temporal alignment between lyrics of the vocal and the music audio signal from the dominant sound audio signal at least one predetermined time,
phoneme network storage means for storing a phoneme network constituted from a plurality of phonemes and short pauses in respect of lyrics in music corresponding to the music audio signal, and
alignment means for performing an alignment operation that makes the temporal alignment between the plurality of phonemes in the phoneme network and the dominant sound audio signals, the alignment means being provided with a phone model for singing voice that estimates a phoneme corresponding to the temporal-alignment feature, based on the temporal-alignment feature, wherein the alignment means receives the temporal-alignment feature outputted from the temporal-alignment feature extraction means, the information on the vocal section and the non-vocal section, and the phoneme network, and performs the alignment operation on condition that no phoneme exists at least in the non-vocal section.

* * * * *